(12) United States Patent
Chakraborty et al.

(10) Patent No.: US 11,388,564 B2
(45) Date of Patent: *Jul. 12, 2022

(54) INFRASTRUCTURE-FREE RF TRACKING IN DYNAMIC INDOOR ENVIRONMENTS

(71) Applicant: NEC Laboratories America, Inc., Princeton, NJ (US)

(72) Inventors: Ayon Chakraborty, Plainsboro, NJ (US); Karthikeyan Sundaresan, Manalapan, NJ (US); Sampath Mateo Rangarajan, Bridgewater, NJ (US); Md.Shaifur Rahman, Stony Brook, NY (US)

(73) Assignee: NEC Corporation

( * ) Notice: Subject to any disclaimer, the term of this patent is extended or adjusted under 35 U.S.C. 154(b) by 18 days.

This patent is subject to a terminal disclaimer.

(21) Appl. No.: 17/000,251

(22) Filed: Aug. 21, 2020

(65) Prior Publication Data

US 2021/0185491 A1 Jun. 17, 2021

Related U.S. Application Data

(60) Provisional application No. 62/947,781, filed on Dec. 13, 2019, provisional application No. 62/946,657, filed on Dec. 11, 2019.

(51) Int. Cl.
| | |
|---|---|
| H04W 4/33 | (2018.01) |
| H04W 4/029 | (2018.01) |
| G01S 19/47 | (2010.01) |
| G06K 9/62 | (2022.01) |
| H04W 4/021 | (2018.01) |

(52) U.S. Cl.
CPC ............... *H04W 4/33* (2018.02); *G01S 19/47* (2013.01); *G06K 9/6215* (2013.01); *H04W 4/021* (2013.01); *H04W 4/029* (2018.02)

(58) Field of Classification Search
CPC ..... H04W 4/021; H04W 4/023; H04W 4/025; H04W 4/029; H04W 4/30; H04W 4/33; H04W 4/35; H04W 4/40; H04W 64/003; H04W 74/002; G01S 13/765; G01S 13/876; G01S 19/47; G01S 5/0289
See application file for complete search history.

(56) References Cited

U.S. PATENT DOCUMENTS

| | | | | |
|---|---|---|---|---|
| 9,288,632 B2* | 3/2016 | Yang | ................... | G01S 5/0252 |
| 9,459,104 B2* | 10/2016 | Le Grand | .............. | G01C 21/14 |
| 10,037,508 B1* | 7/2018 | Rusnak | ................ | H04W 4/023 |
| 11,093,999 B2* | 8/2021 | Key | ........................ | G01S 19/48 |
| 2004/0193707 A1* | 9/2004 | Alam | ...................... | H04L 67/18 |
| | | | | 709/223 |
| 2006/0064202 A1* | 3/2006 | Gutmann | ............. | G05D 1/0251 |
| | | | | 700/245 |
| 2007/0103292 A1* | 5/2007 | Berkley | .................. | G07C 9/28 |
| | | | | 340/539.13 |
| 2008/0033645 A1* | 2/2008 | Levinson | ............. | G01S 5/0252 |
| | | | | 701/469 |
| 2008/0252527 A1 | 10/2008 | Garcia | | |
| 2009/0201149 A1 | 8/2009 | Kaji | | |
| 2010/0142445 A1* | 6/2010 | Schlicht | ................. | H04W 4/20 |
| | | | | 370/328 |

(Continued)

*Primary Examiner* — Jean A Gelin
(74) *Attorney, Agent, or Firm* — Joseph Kolodka

(57) ABSTRACT

Aspects of the present disclosure describe systems, methods, and structures infrastructure-free RF tracking in dynamic indoor environments.

10 Claims, 37 Drawing Sheets

(56) References Cited

U.S. PATENT DOCUMENTS

| | | | | |
|---|---|---|---|---|
| 2010/0148977 A1* | 6/2010 | Tseng | .................... | G01S 5/30 |
| | | | | 340/686.1 |
| 2010/0169147 A1* | 7/2010 | McCormack | .......... | G06Q 30/02 |
| | | | | 705/7.12 |
| 2011/0080848 A1* | 4/2011 | Khorashadi | .......... | G01C 21/206 |
| | | | | 370/254 |
| 2011/0294515 A1* | 12/2011 | Chen | .................... | H04W 64/00 |
| | | | | 455/456.1 |
| 2013/0316724 A1* | 11/2013 | Saeedi | ................. | G08G 1/20 |
| | | | | 455/456.1 |
| 2015/0327018 A1* | 11/2015 | Rehnberg | .............. | G01S 5/0205 |
| | | | | 370/252 |
| 2016/0066158 A1* | 3/2016 | Xiao | .................... | H04W 4/021 |
| | | | | 455/456.1 |
| 2016/0066168 A1* | 3/2016 | Fodor | ................. | H04W 40/246 |
| | | | | 455/404.1 |
| 2016/0353238 A1* | 12/2016 | Gherardi | ............ | H04W 4/027 |
| 2017/0010607 A1* | 1/2017 | Barias | ................ | H04N 5/23219 |
| 2017/0270702 A1* | 9/2017 | Gauthier | .................. | G06F 8/34 |
| 2017/0318407 A1* | 11/2017 | Meister | ................... | H04S 7/303 |
| 2018/0328753 A1* | 11/2018 | Stenning | ................ | G01C 21/08 |
| 2020/0096598 A1* | 3/2020 | Jadav | .................... | G01S 5/14 |
| 2020/0302510 A1* | 9/2020 | Chachek | .............. | G06K 9/6289 |

* cited by examiner

| Item | Avg. Current (mA) | Voltage (V) | Power (mW) | (3000mA, 3.7V) Battery |
|---|---|---|---|---|
| DW1000 UWB | 120 | 3.3 | 396 | >1 day |
| STM32 MCU | 200 | 3.3 | 660 | 17 hrs |
| DynoLoc Tag | 350 | 3.3 | 1155 | 9.5 hrs |
| COTS EVK1000 | 450 | 3.7 | 1665 | 6 hrs |

*FIG. 17(B)*

INFRASTRUCTURE-FREE RF TRACKING IN DYNAMIC INDOOR ENVIRONMENTS

CROSS REFERENCE

This disclosure claims the benefit of U.S. Provisional Patent Application Ser. No. 62/946,657 filed Dec. 11, 2019, and U.S. Provisional Patent Application Ser. No. 62/947,781 filed Dec. 13, 2019, the entire contents of each incorporated by reference as if set forth at length herein.

TECHNICAL FIELD

This disclosure relates generally to tracking mobile entities indoors. More particularly, it pertains to RF tracking of mobile entities in an infrastructure-free, dynamic indoor environment.

BACKGROUND

As is known, promising solutions exist today that can accurately track mobile entities indoors using visual inertial odometry in favorable visual conditions, or by leveraging fine-grained ranging (RF, ultrasonic, IR, etc.) to reference anchors. However, such solutions are unable to effectively operate in "dynamic" indoor environments (e.g. first responder scenarios, multi-player AR/VR gaming in everyday spaces, etc.) that are devoid of such favorable conditions or reference anchors.

SUMMARY

The above problem is solved and an advance in the art is made according to aspects of the present disclosure directed to systems, methods, and structures that provide the locating/tracking of mobile entities in a dynamic indoor environment without infrastructure support or—as noted above—favorable visual conditions.

In sharp contrast to the prior art, and viewed from a first aspect—systems, methods, and structures according to aspects of the present disclosure provide for the infrastructure-free tracking by: providing each individual one of the plurality of nodes located in the infrastructure-free, dynamic indoor environment with a radio tag; determining a topology estimate of the plurality of nodes; determining relative localizations of the plurality of nodes by generating rigid k-core sub-graphs of the topology estimate; transforming the relative localizations into absolute localizations; and outputting indicia of the absolute locations.

BRIEF DESCRIPTION OF THE DRAWING

A more complete understanding of the present disclosure may be realized by reference to the accompanying drawing in which:

FIG. 11(A), FIG. 11(B), FIG. 11(C), and FIG. 11(D), are a series of plots showing comparison of localization error for various method of localization in which: FIG. 11(A) is No. of nodes; FIG. 11(B) is % Mobile Nodes; FIG. 11(C) is Refresh Rate (Hz); and FIG. 11(D) is Velocity (m/s), according to aspects of the present disclosure;

FIG. 17(B) shows power benchmarks for various system components and adaption to an unknown environment according to aspects of the present disclosure;

Figure 1A:
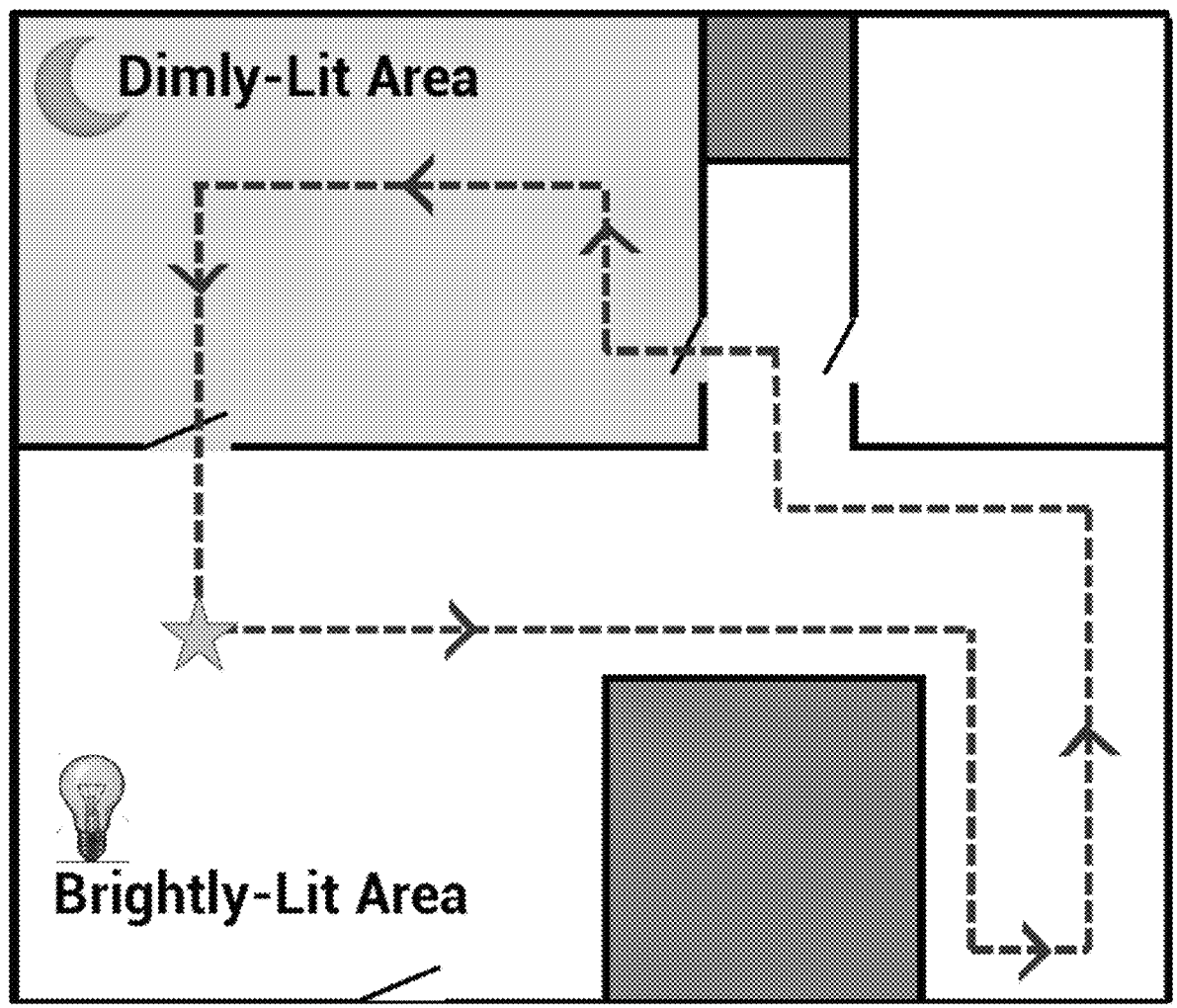
FIG. 1(A) is a schematic diagram showing an illustrative, simple experiment to demonstrate persistent localization errors in a VIO-based system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that there exist contemporary solutions that can accurately track mobile entities indoors using visual inertial odometry in favorable visual conditions, or by leveraging fine-grained ranging (RF, ultrasonic, IR, etc.) to reference anchors. However, they are unable to directly cater to "dynamic" indoor environments (e.g. first responder scenarios, multi-player AR/VR gaming in everyday spaces, etc.) that are devoid of such favorable conditions. As such, there exists a continuing and pressing need for systems, methods, and structures providing mobile entity tracking in an "infrastructure-free" environment, while providing a robustness to "node mobility" and "visual conditions" in such environments. Such systems, methods and structures must also address a novel and challenging variant of infrastructure-free (i.e. peer-to-peer) localization problems that are latency-bounded—wherein accurate tracking of mobile entities imposes a latency budget that not only affects solution computation but also the collection of peer-to-peer ranges themselves.

As we shall show and describe, we present a design and illustrative deployment of a system we call "DynoLoc", that advantageously addresses this latency-bounded infrastructure-free RF localization problem. To this end, DynoLoc unravels the fundamental tradeoff between latency and localization accuracy and incorporates design elements that judiciously leverage the available ranging resources to adaptively estimate the joint topology of nodes, coupled with robust algorithm(s) that maximizes localization accuracy even in the face of practical environmental artifacts (wireless connectivity and multipath, node mobility, etc.). This advantageously allows DynoLoc to track (every second) a network of tens of mobile entities even at speeds of 1-2 m/s with median accuracies under 1-2 m (compared to 5 m+ with baselines)—without infrastructure support. We illustratively demonstrate DynoLoc's potential in a real-world firefighter drill, as well as two other use cases of (i) multi-player AR/VR gaming, and (ii) active shooter response/tracking by first responders.

INTRODUCTION

Dynamic indoor environments. As we have note previously, there exist several promising solutions for indoor localization that leverage various modalities (RF, ultrasonic, optical (IR) tracking, etc.) and multiple dimensions (antennas, channels, access points, etc.) to provide fine-grained (sub-meter, decimeter-level) localization.

As noted further, the effectiveness of such contemporary solutions is extremely dependent on the particular environment in which they operate. Note that the majority of contemporary localization solutions require static anchor nodes positioned in in known locations to provide distance estimate(s) to a target client (a.k.a. ranging), which are then aggregated to determine its location.

Figure 1B:
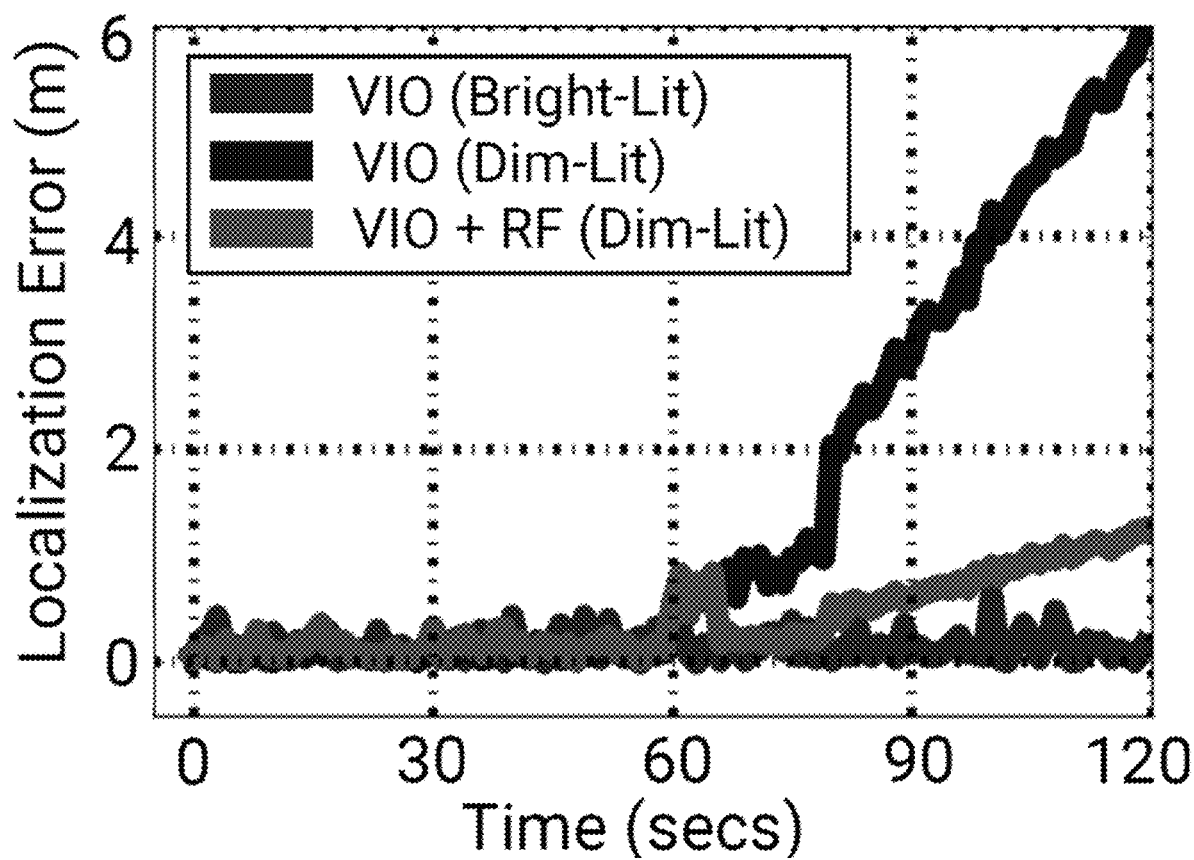
FIG. 1(B) is a plot showing localization error for various lighting conditions for the experiment using a VIO-based system.

Infra-free solutions—on the other hand—that employ inertial sensors are prone to accumulating errors of tens of meters over extended periods of time. Even high-accuracy (cm-level) solutions for AR/VR that are based on Visual Inertial Odometry (VIO) such as fuse cameras and IMUs, suffer appreciably (as shown schematically in FIG. 1(A) and FIG. 1(B)) when the operating environment is not well lit/textured, has motion blur and/or dynamic entities in screen, etc. Unfortunately, and as will be readily understood and appreciated by those skilled in the art, existing anchor-based and infra-free solutions do not effectively operate in "dynamic" indoor environments that are inherently characterized by the lack of reference anchors, unfavorable visual conditions, and mobile entities.

RF-based localization for dynamic environments: Localization and tracking in such dynamic environments, especially with mobile clients, are not only central to all first responder scenarios, but also enable new capabilities in emerging consumer applications including mixed reality (MR) gaming—where multiple players engaged in an AR/VR game are tracked in real-time across large, everyday (unmapped) indoor spaces that span multiple rooms in less-than-favorable visual conditions. Those skilled in the art will appreciate that an RF-based localization solution that can deliver high accuracies (sub-meter, i.e., cm)—without relying on anchors—can fill this critical need as a stand-alone solution for first responder applications, and a complementary solution to VIO (for alleviating its errors) for MR gaming applications, owing to its robustness in unfavorable visual conditions.

Gap between ranging and localization. Obtaining accurate ranges (i.e. distances) between clients (nodes) and anchors in infrastructure applications, automatically leads to accurate localization of the clients through multilateration. However, in the absence of such anchor infrastructure, nodes only range with respect to each other. Of course, and as will be readily appreciated by those skilled in the art, there is a large technical gap between such relative ranging and localization in dynamic environments, where existing multilateration approaches cannot be effectively employed.

Challenges in addressing the gap. As will be appreciated, localizing nodes in an absolute frame of reference is challenging without one or more reference nodes. However, existing works in the sensor literature have shown that if one can estimate the relative geometry of nodes (called relative localization) using their pair-wise measured ranges; then, additional information (such as IMU data, floor plan, etc.) can be used to potentially rotate, translate or flip this relative geometry to obtain the absolute localization of the nodes. The resulting efforts that focused on relative localization albeit amenable to theoretical analysis, however, do not account for a critical dimension needed for practical deployments, namely node mobility. Incorporating node mobility however, significantly changes the nature of the problem, requiring one to solve the latency-bounded version of the infrastructure-free RF localization problem, which has heretofore not been addressed. Indeed, infrastructure free localization solutions today are unable to track even a network of around 10 mobile nodes (at just 1 m/s speed) with an accuracy of under 6 m. This can be attributed to the following key challenges:

(i) Latency vs. accuracy tradeoff: Accurate location determination of the nodes requires that nodes be tracked at least once every second (i.e. refresh rate of 1 Hz) for a node mobility of 1-1.5 m/s. The corresponding latency constraint restricts the number of node-pairs that can be ranged (before computing a localization solution), thereby lowering the accuracy of localization significantly by several folds. Further, the quality of links (edges) and hence the ranges measured, are in turn impacted by the geometry of the induced topology, node mobility as well as the multi-path wireless channel, and have a large impact on the accuracy as well.

(ii) Overhead of range measurements: Ranging between node pairs is accomplished through sequential packet exchanges and time-of-flight estimation techniques, thereby incurring a large latency and hence reduced ability to track a large network of mobile nodes.

(iii) Partial information degrades accuracy: Existing solutions for relative localization (e.g. techniques using Euclidean distance matrices, EDM) work well when network topologies are a complete graph and all range estimates are available and accurate. However, in the absence of such features in practical deployments, the accuracy can suffer appreciably.

DynoLoc (Dynamic Indoor Localization) design. Towards addressing these challenges, we present DynoLoc—a system and attendant methods and structure for latency-bounded infrastructure-free localization that advantageously may be readily deployed in dynamic indoor environments. While DynoLoc's framework is agnostic to the underlying wireless technology (e.g. WiFi, UWB, mmWave) used for ranging, it currently employs UWB, given the latter's ability to offer a desirable ranging resolution (tens of cm) at reasonable indoor penetration (70-90 m LOS, 30-50 m NLOS).

As we shall show and describe further, DynoLoc equips each of node that requires tracking with a tag that utilizes a UWB radio (for ranging), WiFi radio (for control/orchestration), and IMU. While UWBs are the primary source of active ranging, IMUs are used in a limited scope (heading and mobility indication) to resolve ambiguities in localization. DynoLoc's design involves three key components:

Topology estimation for ranging: DynoLoc intelligently uses its available ranging resources on critical links that will contribute the most to topology's localization accuracy. The critical nature of a link varies spatio-temporally and is determined by DynoLoc by fusing three dimensions of information, namely (a) mobility of nodes in the link (that affect the staleness of its range measurement), (b) certainty of range estimates being LOS vs. NLOS (inferred from channel impulse response measurements), and (c) link's contribution to the topology's geometry in creating a robust and maximally rigid (where relative location of nodes are fixed in the topology) sub-graph that in turn leads to increased localization accuracy.

Aggregated and concurrent ranging: DynoLoc redesigns the traditional pair-wise and sequential ranging protocol for reduced measurement latency. It aggregates (and amortizes), the process of ranging (and associated overhead) for a node with all its neighbors into a single compacted process, while links that are spatially separated, can enable such ranging concurrently.

Robust relative localization: Instead of applying EDM completion techniques on the entire topology that is incomplete, DynoLoc leverages the graph rigidity construct of k-core sub-graphs to identify maximal rigid sub-graphs of the topology, and applies EDM on these separately and combines them to provide a robust, accurate solution. Given the relative localization of nodes in the rigid sub-graphs, DynoLoc devises additional mechanisms to localize the remaining nodes in the topology by leveraging geometric constraints driven by range, physical connectivity as well as heading data from IMUs.

Finally, with little additional meta information, contributed by IMU heading data or floor plans, DynoLoc efficiently transforms the relative localization solution into absolute coordinate system without affecting the solution's refresh rate.

As we shall show and describe, we have built and deployed DynoLoc in real-world dynamic environments, including in a live firefighters' drill (see, FIG. 2), where its accuracy and value in saving lives was well-appreciated. Designed with mobility (and hence latency) in mind, DynoLoc delivers superior performance in infra-free tracking across multiple dimensions of node density, mobility, application refresh rate, etc.

In particular, evaluation in two real-world use-cases, reveal that (i) first-responder scenarios: DynoLoc is able to track a network of 12 (20) responders, operating with speeds up to 1 m/s (2 m/s) with a median localization error of under 1 m (2 m), while delivering a refresh rate of 1 Hz; existing solutions suffer in accuracy (6 m+error) even for a node mobility of 1 m/s; (ii) AR gaming: DynoLoc tracks translational motion of users accurately across a free-flowing indoor space of 20 m×20 m with latencies of under 64 msec to enable a highly-responsive, dynamic 3-player AR game even in sub-optimal lighting conditions—a scenario that is challenging for VIO, especially in the multi-player context. In future, we aim to fuse VIO with DynoLoc to deliver on VIO's performance even in realistic everyday scenarios.

As we shall show and describe, we introduce and address a problem of latency bounded, infrastructure free localization that is critical for tracking in several dynamic indoor applications. Toward that end, we build and demonstrate the viability of such a system we call DynoLoc, in two real world use-cases targeting first responders (a real firefighters' drill and active shooter tracking) and multi-player AR/VR gaming.

We consider the problem of tracking mobile entities (nodes) in dynamic indoor environments, namely those that are un-calibrated, lack externally deployed localization infrastructure, and characterized by node mobility. This features a pressing need in first responder situations (as evident from NIST programs), with the potential to enable anchor-less user tracking in multiplayer AR/VR gaming applications in the future.

Additional Background on Related Approaches

Figure 3A:
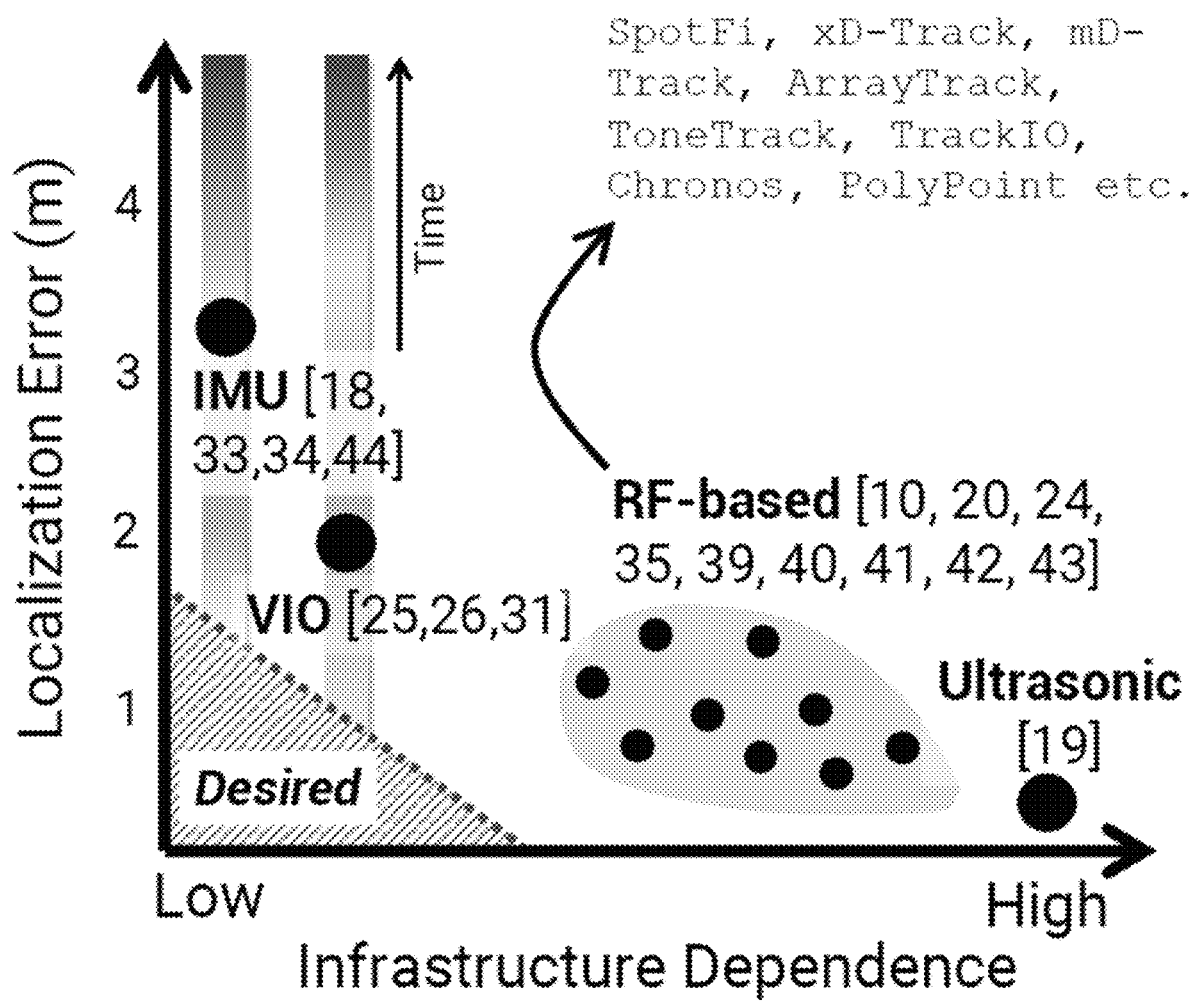
FIG. 3(A) is a plot showing localization accuracy as a function of dependence on deployed infrastructure according to aspects of the present disclosure.
Figure 3B:
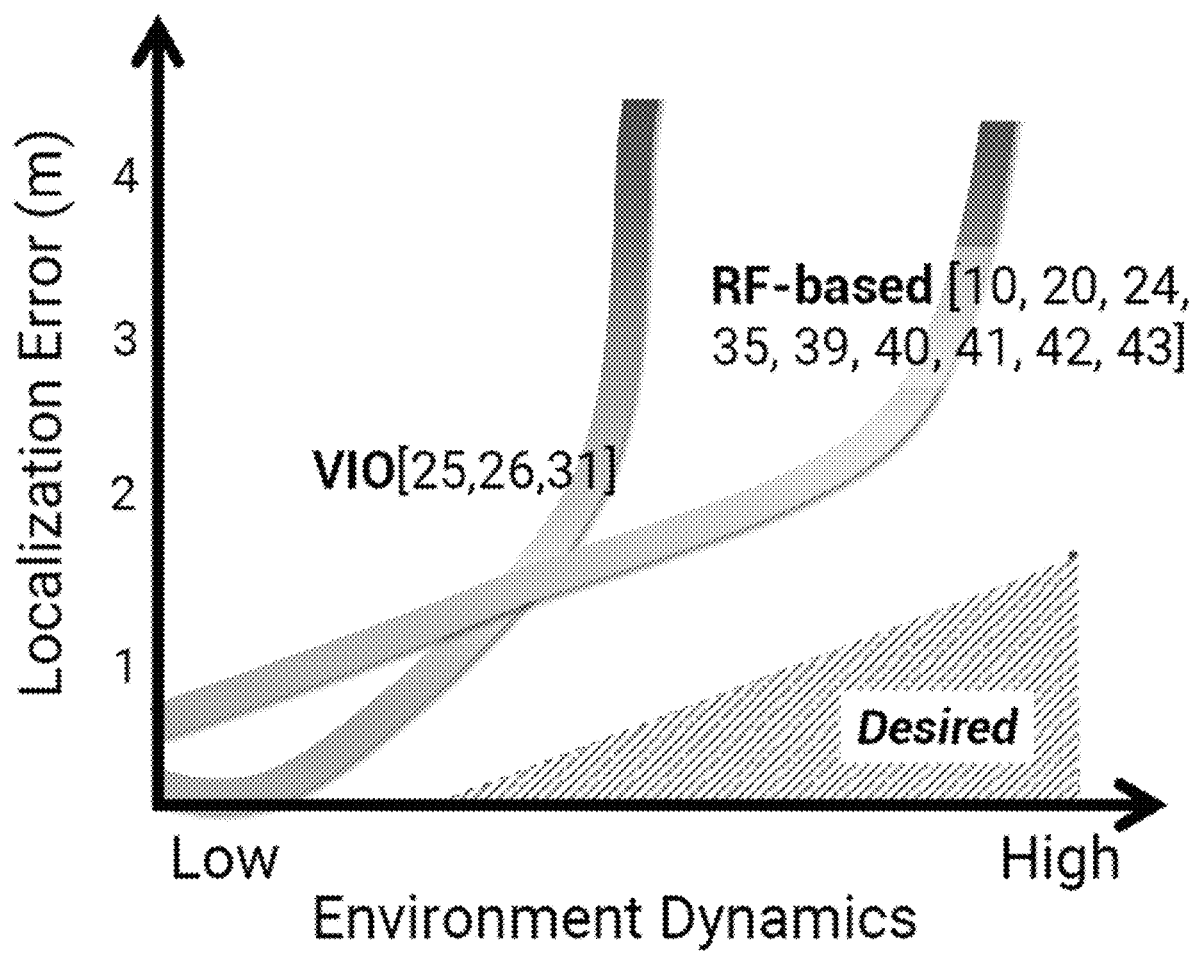
FIG. 3(B) is a plot showing localization accuracy as a function of the dynamics of environment according to aspects of the present disclosure.

We note that the literature is rich in the area of active (locating and identifying) indoor localization which can be broadly categorized as (i) Anchor-based, and (ii) Infrastructure-free, as shown in FIG. 3.

Anchor-based. Anchor-based approaches often surpass their infra-free counterparts in accuracy at the expense of apriori deployed infrastructure for localization—a tradeoff captured in FIG. 3. Here, beacons are deployed at known locations and serve as reference points or anchors. A node estimates its distances (also called ranges) from three such anchors, which are then combined with the anchors' locations to estimate its own location by a technique typically known in the art as multilateration. Given a technology to perform accurate ranging, localization can be considered a trivial extension. Hence, most of the prior art in this space has focused on the accurate estimation of such ranges, particularly using WiFi access points as beacons, while some have also leveraged ultrasonic beacons.

WiFi-based approaches leverage signal information across multiple dimensions—frequency, antenna arrays, or both, to improve accuracy in the face of limited WiFi bandwidth and multipath. Some of them adopt a fingerprinting approach (using RSSI, CSI, etc.) to calibrate the environment a-priori that is later used for real-time location inference.

Optical tracking systems (e.g. HTC Vive) that are popular in the AR/VR industry, employ multiple IR beacons (LEDs/cameras) to provide mm-level tracking accuracy, but are restricted to line-of-sight and expensive to deploy.

Those skilled in the art will—at this point—recognize that the fundamental dependence on pre-deployed anchors (mostly static, but sometimes mobile—e.g. outdoor drones), prevents such prior art approaches from successful deployment in our noted target environment.

Infrastructure-free. Infrastructure-free approaches are more amenable to our target environment, but exhibit a different tradeoff between accuracy and robustness, as captured in FIG. 3. One particular infrastructure-free approach, inertial sensor-based, are inherently local to a node (no ranging needed), and hence popular. However, with only dead-reckoning of nodes, errors accumulate significantly over time, especially in case of pedestrian mobility.

State-of-the art AR/VR solutions (e.g. ARCore) leverage visual inertial odometry (VIO) that combines both cameras and IMUs to provide accurate cm-level tracking in favorable conditions. However, such AR/VR approaches require anchors and their performance suffers significantly in poorly illuminated and/or poorly textured environments, in presence of motion-blur and/or multiple moving objects in the video-frames, as shown in FIG. 1. Such practical conditions result in various errors relating to drift, loop-closure, scale ambiguity etc. (for SLAM-based approaches), and errors related to projection, parameterization etc. (for optical-flow based approaches).

Those skilled in the art will readily understand and appreciate that dynamic environments—particularly those in first responder scenarios—can significantly benefit from an alternate RF modality that can deliver good accuracies (sub-1-2 m), and which is robust to the lacking of such favorable conditions. In AR/VR gaming applications, such a modality can be complementary in helping to eliminate the accumulating errors faced by VIO, with periodic absolute location fixes.

Role of RF in Infra-Free Localization

The recent popularity of ultra wide-band (UWB) technology, and its ability to span a wide 500-1000 MHz bandwidth with superior multipath suppression (owing to its impulse transmissions), has made it a popular candidate for sub-m localization, albeit with the help of infrastructure anchors. Existing works in this space are largely concerned with scalable ranging (SurePoint, SnapLoc) and tracking of individual mobile nodes (e.g., indoor drone, PolyPoint). However, in the absence of reference anchors, UWB's two-way-ranging (TWR) mechanism can enable the nodes to only range with each other. Hence, localization in dynamic environments presents a different challenge, which, beyond the estimation of accurate ranges, needs to translate the ranges to an accurate localization solution. Indeed, the key focus of infra-free RF localization comes down to bridging this gap between estimated ranges and node localization that arises in the absence of anchors.

Primer on Relative Localization. In contrast to anchor-based approaches, where nodes are absolutely localized in the coordinate space defined by the anchors, localization in infra-free set-up is a two-step process. First, the nodes are relatively localized among themselves, following which some meta information (e.g. orientation of the nodes, or floorplans) is leveraged to transform such relative localization to the absolute coordinate space. Relative localization refers to the geometry or a topology among the nodes, where the pairwise distance between nodes as well as their relative orientation are preserved. In determining such a relative localization, the construct of a rigid body is useful.

Let $G=(V,E,d)$ be a weighted graph, where d is the set of range measurements (weights) for the $|E|$ edges defined on the $|V|$ nodes. A realization is a function $x: V \rightarrow R^2$ that maps the set of vertices V to the 2D Euclidean space such that each range value is preserved i.e $\forall (u,v) \in E, \|x(u)-x(v)\|=d(u,v)$ where $\|.\|$ is the Euclidean norm.

Figures 4A, 4B, 4C:
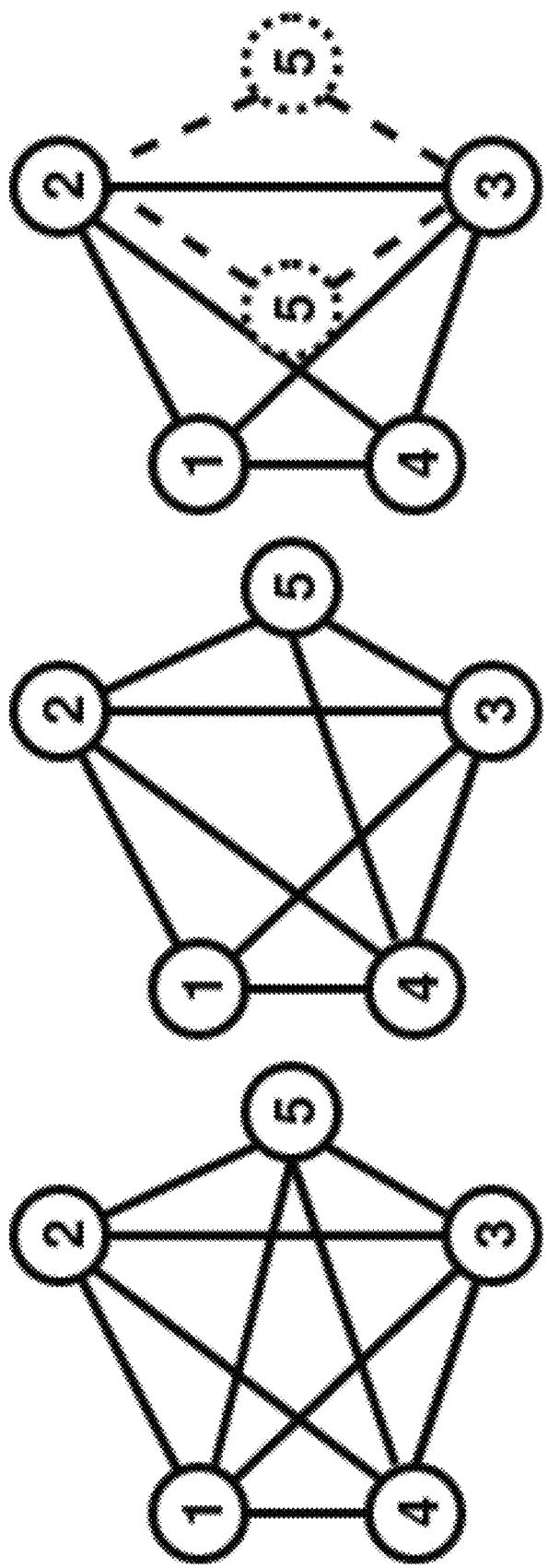
FIG. 4(A) is a weighted graph illustrating a Clique (rigid) arrangement according to aspects of the present disclosure.
FIG. 4(B) is a weighted graph illustrating a non-clique (rigid) arrangement according to aspects of the present disclosure.
FIG. 4(C) is a weighted graph illustrating two choices for node 5 (not rigid) arrangement according to aspects of the present disclosure.

The graph $G=(V,E,d)$ is "rigid" if there is only one realization, discounting any translation, rotation and flip. Thus, a rigid topology gives us a unique relative localization solution. As shown in FIG. 4(A), FIG. 4(B), and FIG. 4(C), the complete graph or clique in FIG. 4(A) is rigid because given the 10 ranges between all pairs of nodes, this graph is the only realization, although it can be rotated, translated and/or flipped. Similarly, given the 9 ranges, the graph in FIG. 4(B) is rigid. However, that shown in FIG. 4(C) is not rigid, since given the 8 ranges, there are two choices to fix node 5 relative to the edge (2,3) resulting in two potential realizations.

If all possible ranges between nodes are available, computing the relative localization is straight-forward in a static environment. The edge weights of the graph are maintained in the form of an adjacency matrix, EDM (a.k.a. Euclidean Distance Matrix), where each entry represents a measured range between two nodes. Then, an approach called Multi-dimensional Scaling (MDS) is applied on the EDM matrix, whereby an EVD (EigenValue Decomposition) results in an embedding of the nodes (i.e. relative localization) in a 2D Cartesian space. While such a framework of relative localization is appropriate for our dynamic environments, the theoretical approaches in this space are built on several assumptions[1] that do not hold in practice.

[1] e.g. static nodes, accurate range estimates of all node pairs at no cost, etc.

Additional Challenges in a Dynamic Environment

To accurately localize/track mobile nodes, the localization solution needs to be computed and refreshed at a granularity finer than node mobility. For instance, a 1 Hz refresh rate is appropriate to track nodes with speeds of 1-1.5 m/s, targeting a 1-2 m error. However, the refresh rate automatically enforces a latency-bound (cost) for the whole process of relative localization, which involves both the range estimation/collection as well as the solution computation. This results in a latency bounded version of the infra-free localization problem (referred to as LB-IFL) that has not been addressed before.

To understand the impact of such a latency cost on existing approaches in practice, we show an describe an experimental study comparing a genie/anchor-aided localization solution (with all possible range estimates available instantaneously, TDOA) with the one described above, i.e., MDS applied on EDM constructed with a random set of edges (called Base), whose ranges are measured within the latency budget offered by the refresh rate.

Figure 5A:
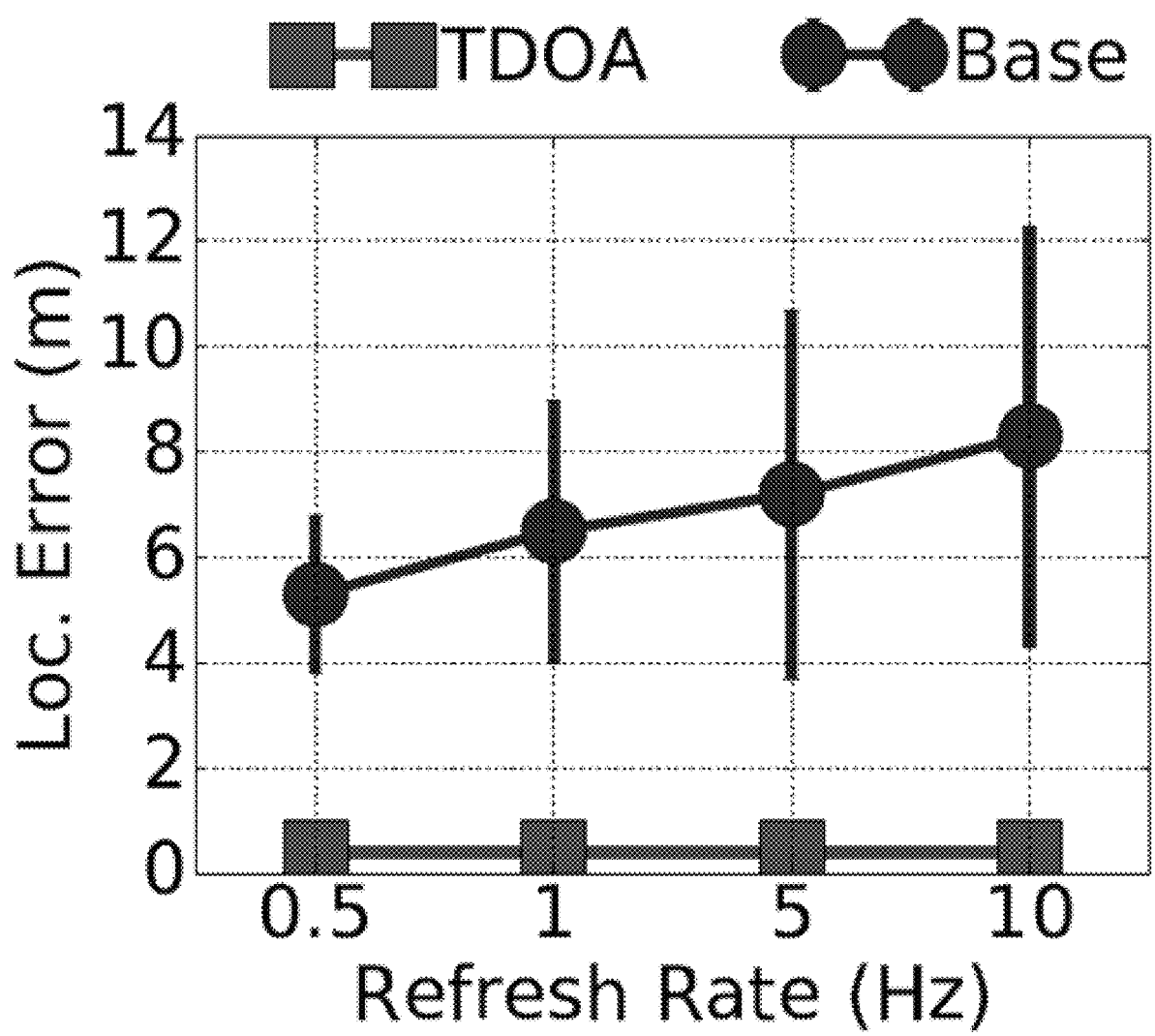
FIG. 5(A) is a plot showing localization error for various refresh rates according to aspects of the present disclosure.
Figure 5B:
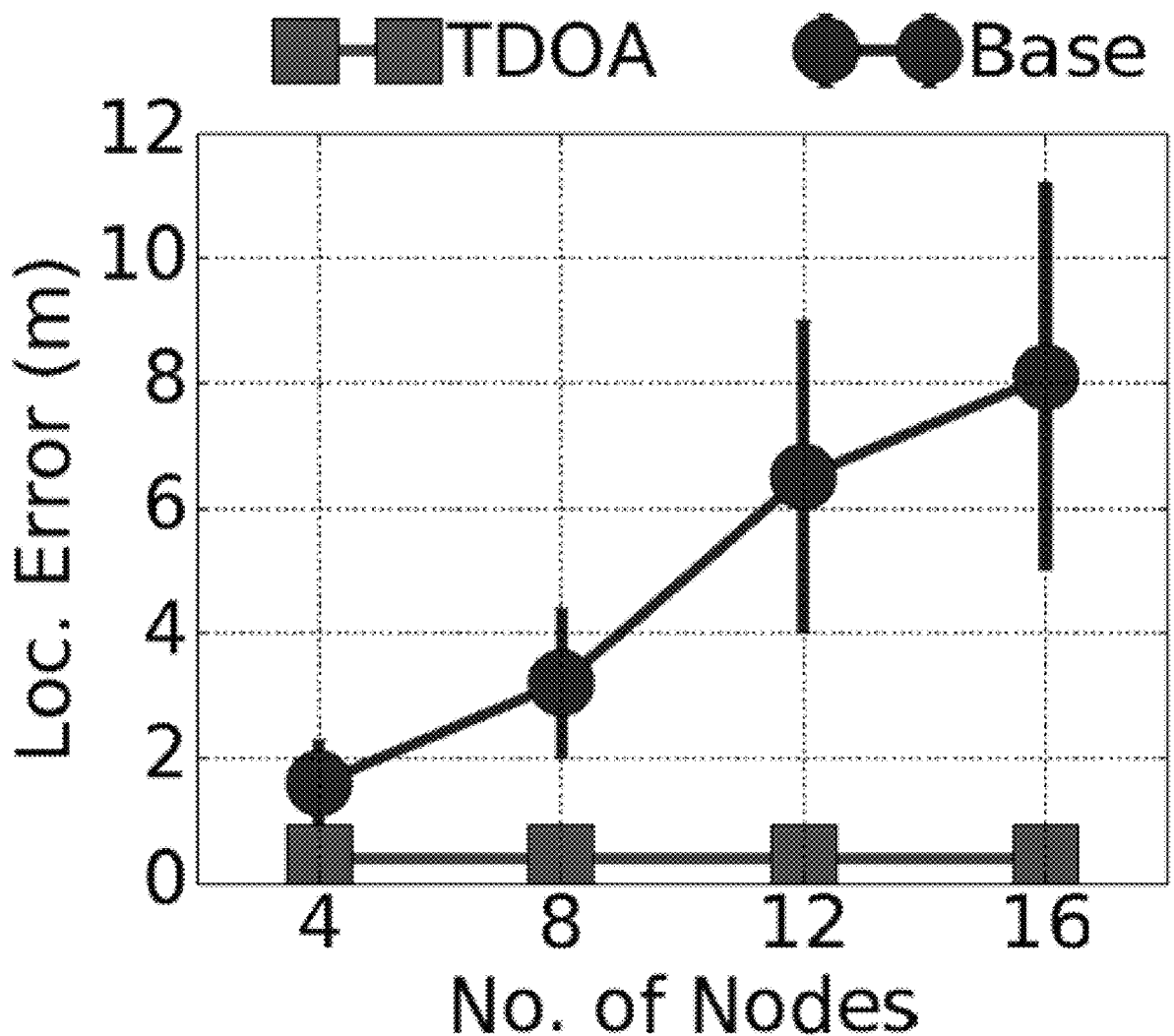
FIG. 5(B) is a plot showing localization error for various number of nodes according to aspects of the present disclosure.

Latency vs. accuracy. Those skilled in the art will readily understand and appreciate that every ranging operation takes a finite amount of time to complete. For instance, with a popular UWB hardware, it takes approximately 40 ms to complete a single range estimate, i.e. a two-way-ranging (TWR) operation. This inherently limits the number of ranges that can be estimated/collected per second to 25 to support a localization update rate of 1 Hz. The results in FIG. 5(A) and FIG. 5(B) show that when budget restrictions increase for a given topology size or vice versa, the accuracy degrades by several folds, clearly exposing a trade-off between latency (cost) and accuracy. This can be attributed to the lack of intelligent topology estimation (edge selection) and robust relative localization schemes that are needed to work with limited latency budgets and hence incomplete range estimates respectively—aspects that have not been addressed thus far. We now further dissect the specific factors contributing to this performance degradation.

Figure 6A:
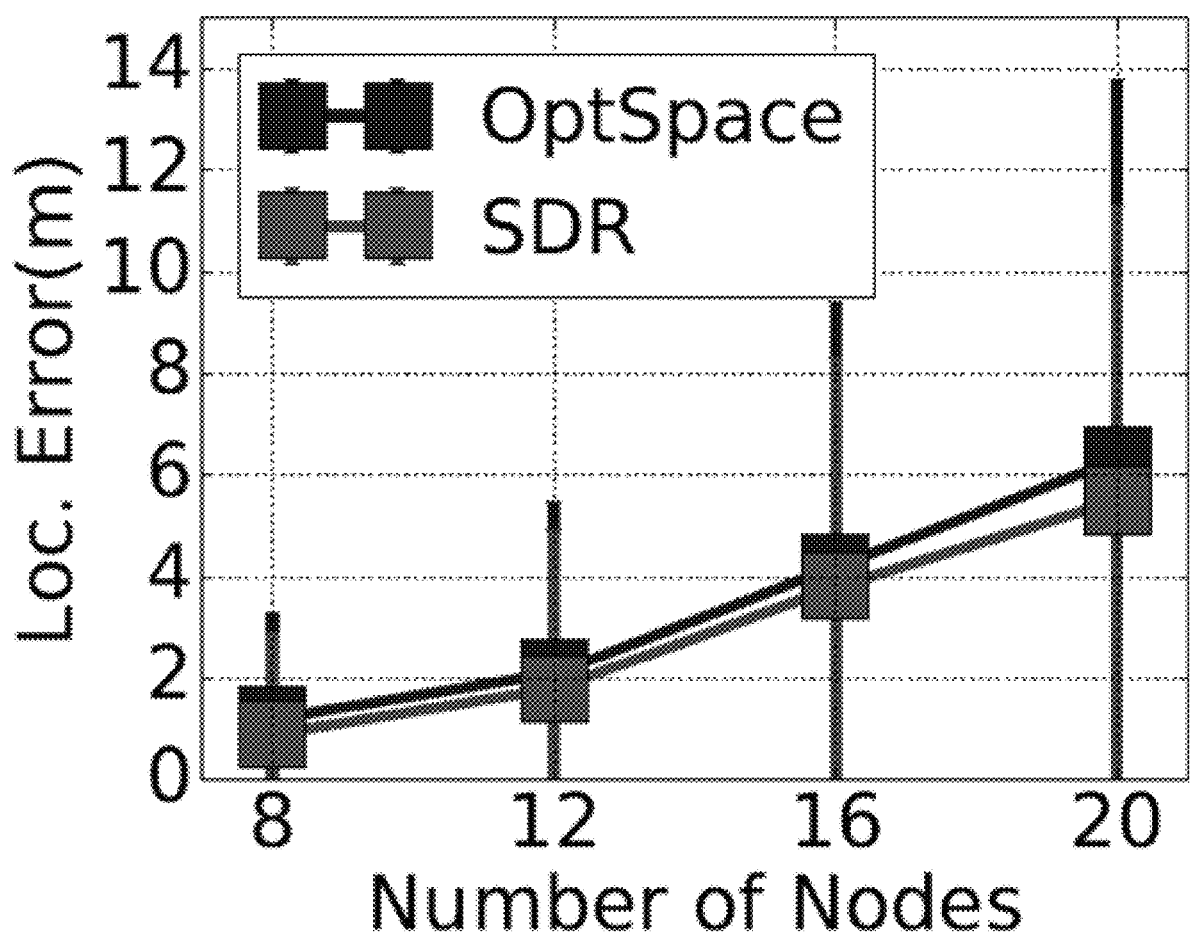
FIG. 6(A) is a plot showing localization error after using various low-rank matrix completion techniques for various topologies according to aspects of the present disclosure.

Incomplete range estimates. In practice, the physical communication range between nodes will limit the topology from being complete. This is further compounded by the limited number of edges (ranges) that can be estimated due to the latency budget. Since an incomplete EDM (i.e. estimated topology is not a clique) can lead to localization inaccuracies, matrix completion methods (e.g., SDR, Opt-Space) are used to complete the EDM before the nodes can be relatively localized. However, the latter are not designed keeping in mind the geometrical implications relevant to a localization problem. This can lead to large localization errors as shown in FIG. 6(A), thereby advocating the need for relative localization schemes that are robust to incomplete range estimates.

Figure 6B:
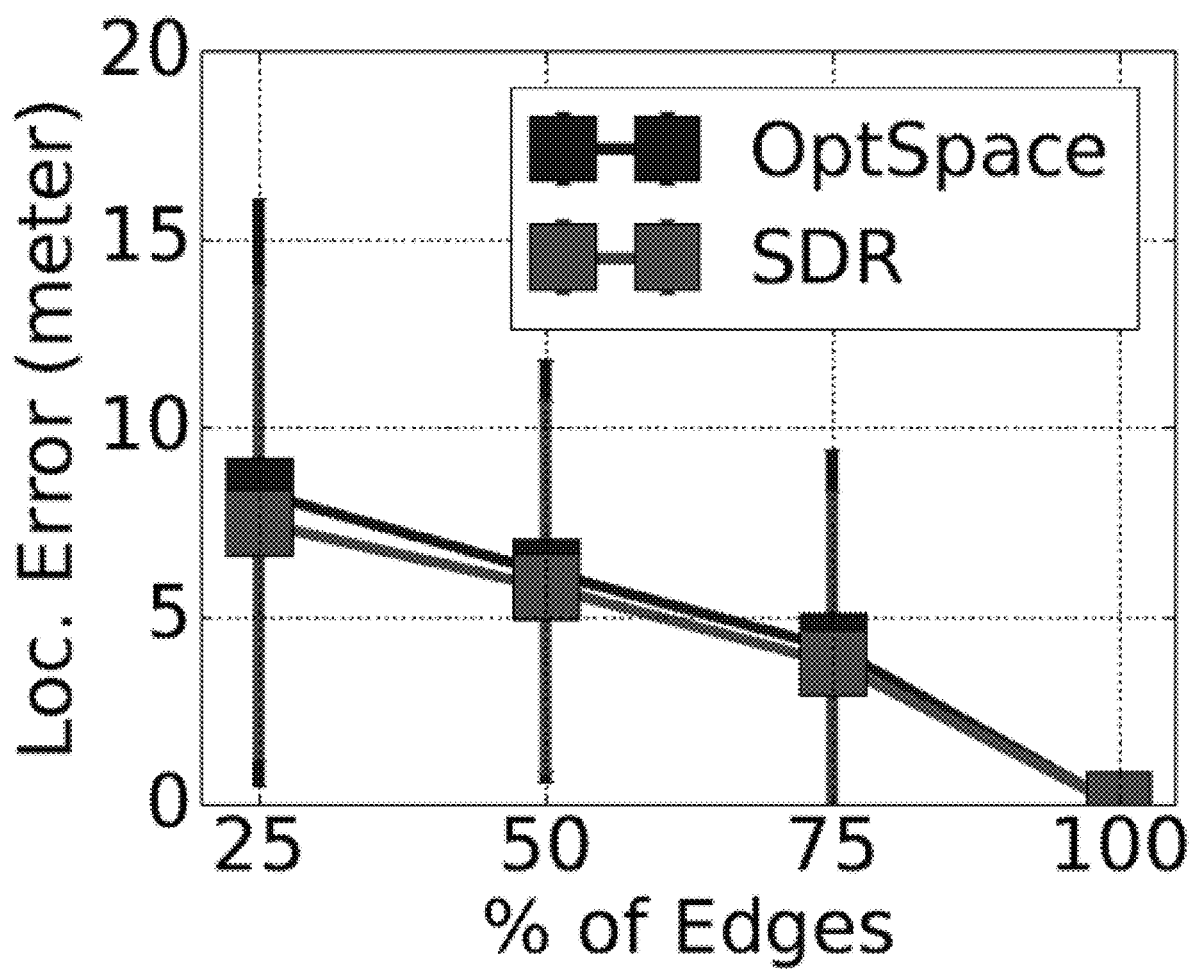
FIG. 6(B) is a plot showing localization error after using various low-rank matrix completion techniques for various set of edges from same topology according to aspects of the present disclosure.

Impact of geometry. An interesting result shown in FIG. 6(B) further indicates that the specific set of edges selected, albeit incomplete, has a large impact on the localization solution as well. This indicates that the geometry of the topology (particularly its rigidity) associated with the edges measured, has a direct impact on the solution and must be factored into the edge and hence topology selection process.

Figure 7A:
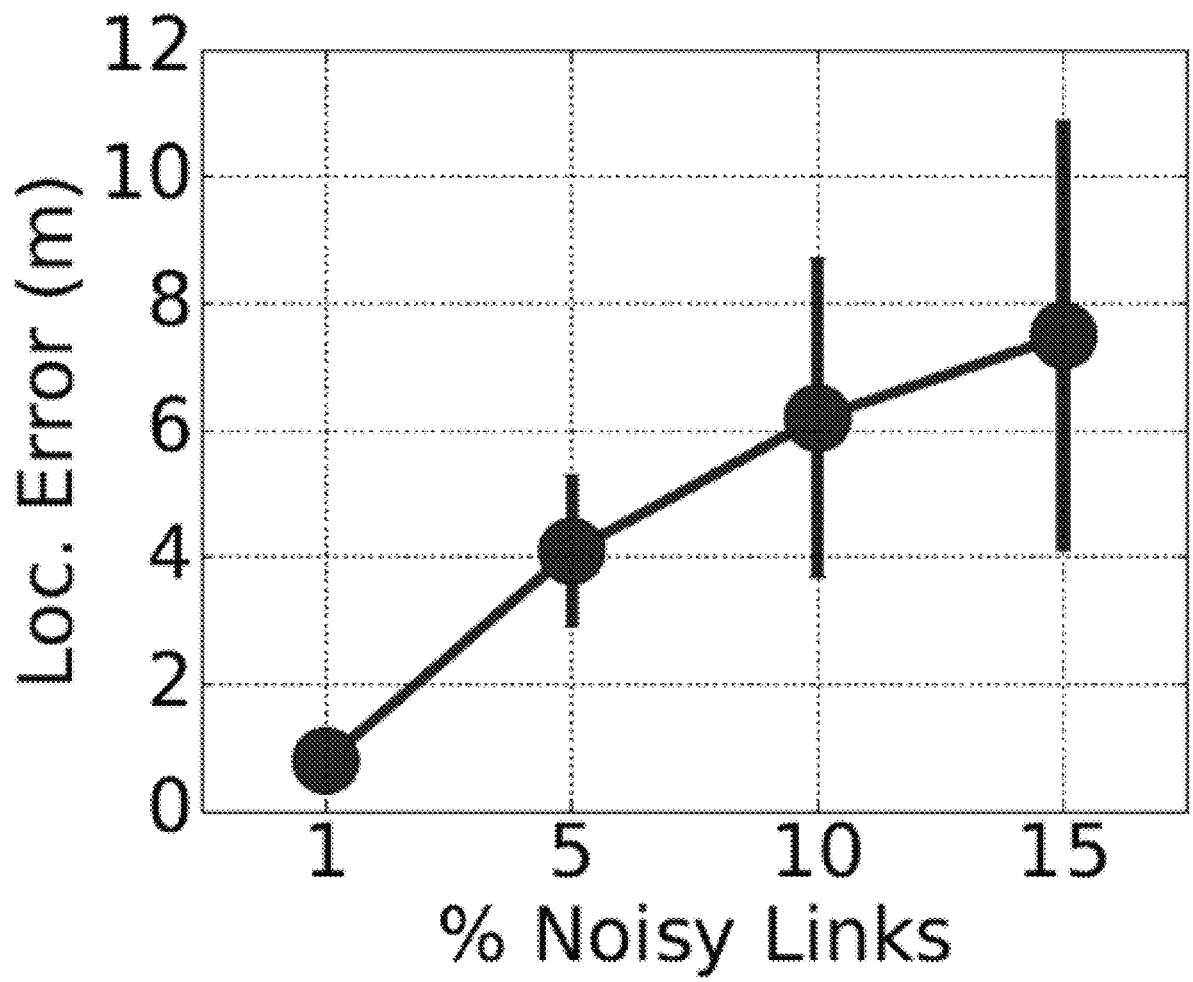
FIG. 7(A) is a plot showing localization error for various levels of link noises according to aspects of the present disclosure.
Figure 7B:
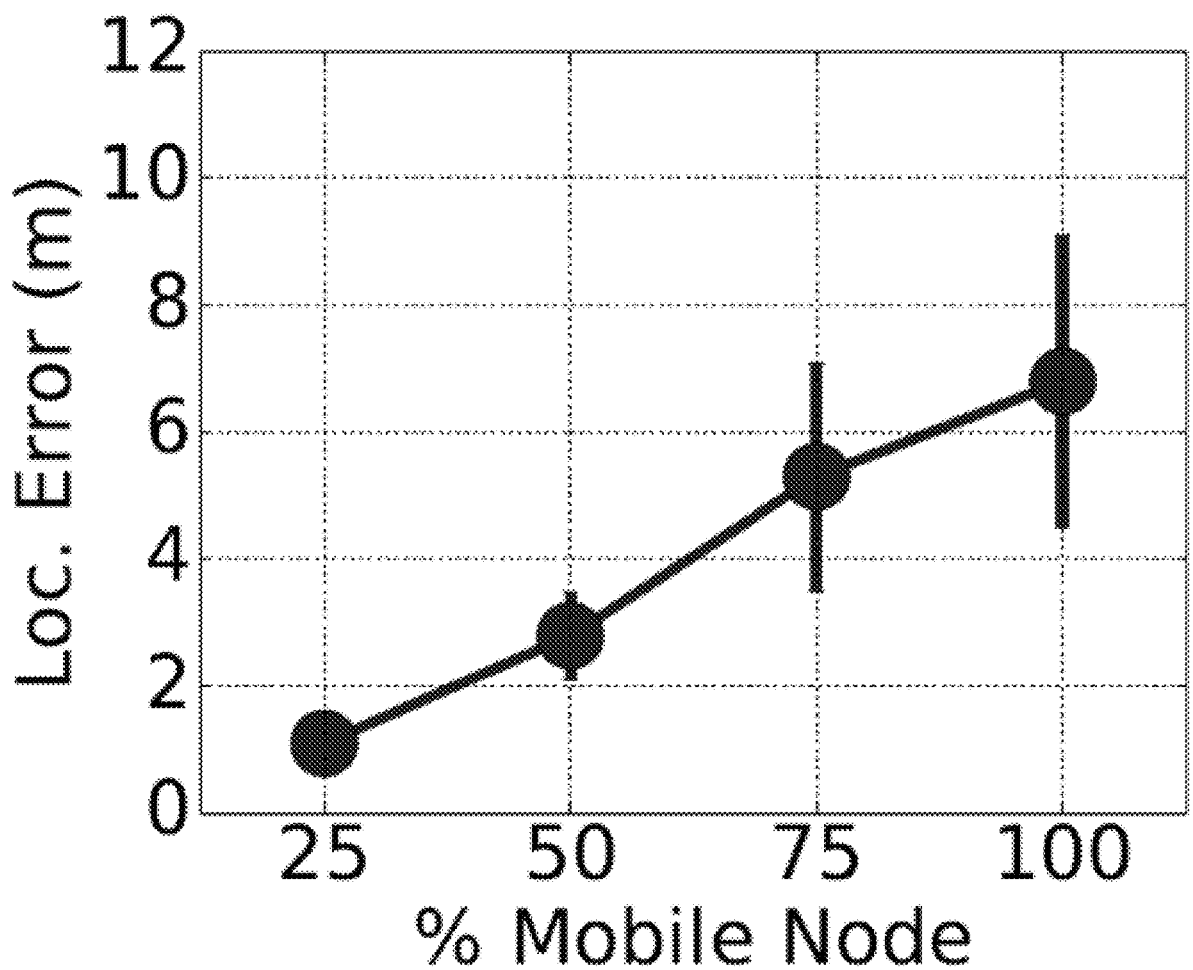
FIG. 7(B) is a plot showing localization error for various fractions of mobile nodes according to aspects of the present disclosure.

Inaccurate range estimates. Inaccurate estimates of even a small set of ranges can lead to degraded accuracy for the entire topology. Here, two key environmental factors, namely LOS blockages (due to body, concrete, etc.), and node mobility, can significantly affect the accuracy of the range estimates. Given the limited budget for range estimation, it is clear that when the edges are picked randomly without taking into account their channel or mobility characteristics, the performance degrades quite rapidly even with a small set of affected edges, as seen in FIG. 7(A) and FIG. 7(B). Thus, characterizing the nature of the edges with respect to their channel and mobility is essential for improved localization accuracy.

Design Requirements

From the above discussions, we now note that the combination of "infrastructure-free" and "node mobility" in practical, dynamic indoor environments, makes the latency bounded version of the localization problem, highly challenging.

In addressing these challenges, two key design requirements are pursued for DynoLoc namely, (a) Support a reasonable number of nodes in a practical deployment setting few 10 s), many of them being mobile (≤2 m/s), and (b) Offer a location update rate (≥1 Hz), tolerable to the underlying location based service that eventually consumes such information.

DynoLoc Design

Figure 7C:
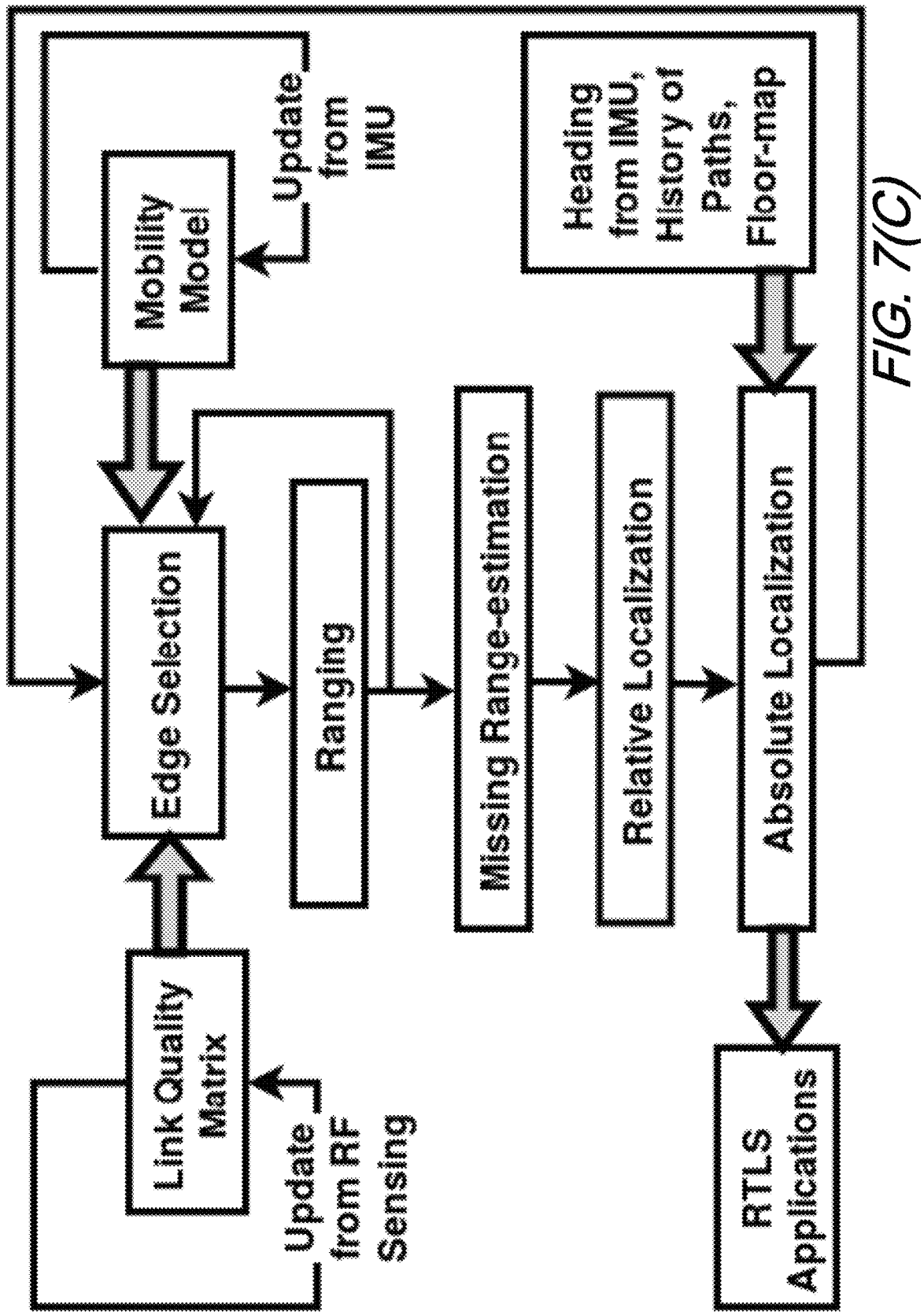
FIG. 7(C) is a block-flow diagram showing a schematic overview of the overall DynoLoc operation.

FIG. 7(C) is a block-flow diagram showing a schematic overview of the overall DynoLoc operation.

At a high level, DynoLoc models the topology among nodes collectively as a graph of rigid components and tracks it accurately over time as the topology evolves subject to node mobility and channel conditions. Within a limited time (determined by the application's refresh rate), DynoLoc's task is to gather as much UWB ranging information (on links) from the network as possible at a master[2] node (using WiFi for control), so as to accurately estimate the underlying topology (See FIG. 2).

[2] One of the nodes doubles up as a master node.

DynoLoc Overview

DynoLoc operates in epochs (rounds), where the locations of all nodes are estimated at the end of each epoch, the duration of which is determined by the application's refresh rate (e.g., 0.5-2 Hz). In every epoch, the following sequence of operations is executed.

I) Topology estimation for ranging Given the underling physical topology (based on connectivity), DynoLoc first determines which of the underlying critical edges need to be ranged within the limited duration available (determined by fresh rate and DynoLoc's ranging protocol). The edge selection is robust in that it prioritizes edges which contribute to the resulting topology being maximally rigid, while avoiding those, whose ranges could be corrupted by multipath; and adaptive in that it prioritizes edges associated with nodes that have been mobile in the recent past thereby leading to a good localization accuracy.

II) Concurrent ranging The selected edges are then ranged using a concurrent ranging protocol that amortizes the overhead of ranging from a node across its neighbors, while enabling concurrent ranging in non-interfering neighborhoods, to minimize the overall latency.

III) Robust relative localization After the estimated topology has been ranged, DynoLoc's localization algorithm intelligently identifies and applies EDM only on sub-graphs of the topology that are rigid and combine them effectively, to deliver both a robust and accurate relative localization.

IV) Absolute localization DynoLoc finally transforms the relative localization solution into an absolute one with little additional meta information (contributed by floor plans or a single reference node), while still delivering the desired refresh rate for the solution.

Estimation of Ranging Topology

One particularly significant innovation embodied in DynoLoc is that it leverages the graph theoretic construct of geometric rigidity to identify the set of edges that would collectively contribute to the accurate localization of the topology as a whole while also adapting itself to track the topology as it evolves with node mobility and channel conditions. DynoLoc accomplishes this by first characterizing the links in the physical connectivity topology, followed by leveraging such a characterization for adaptive link selection.

A. Characterizing the Connectivity Topology: Every link is characterized based on the mobility of its nodes, the multipath nature of its wireless channel, as well as its contribution to the topology's rigidity.

Figure 8:
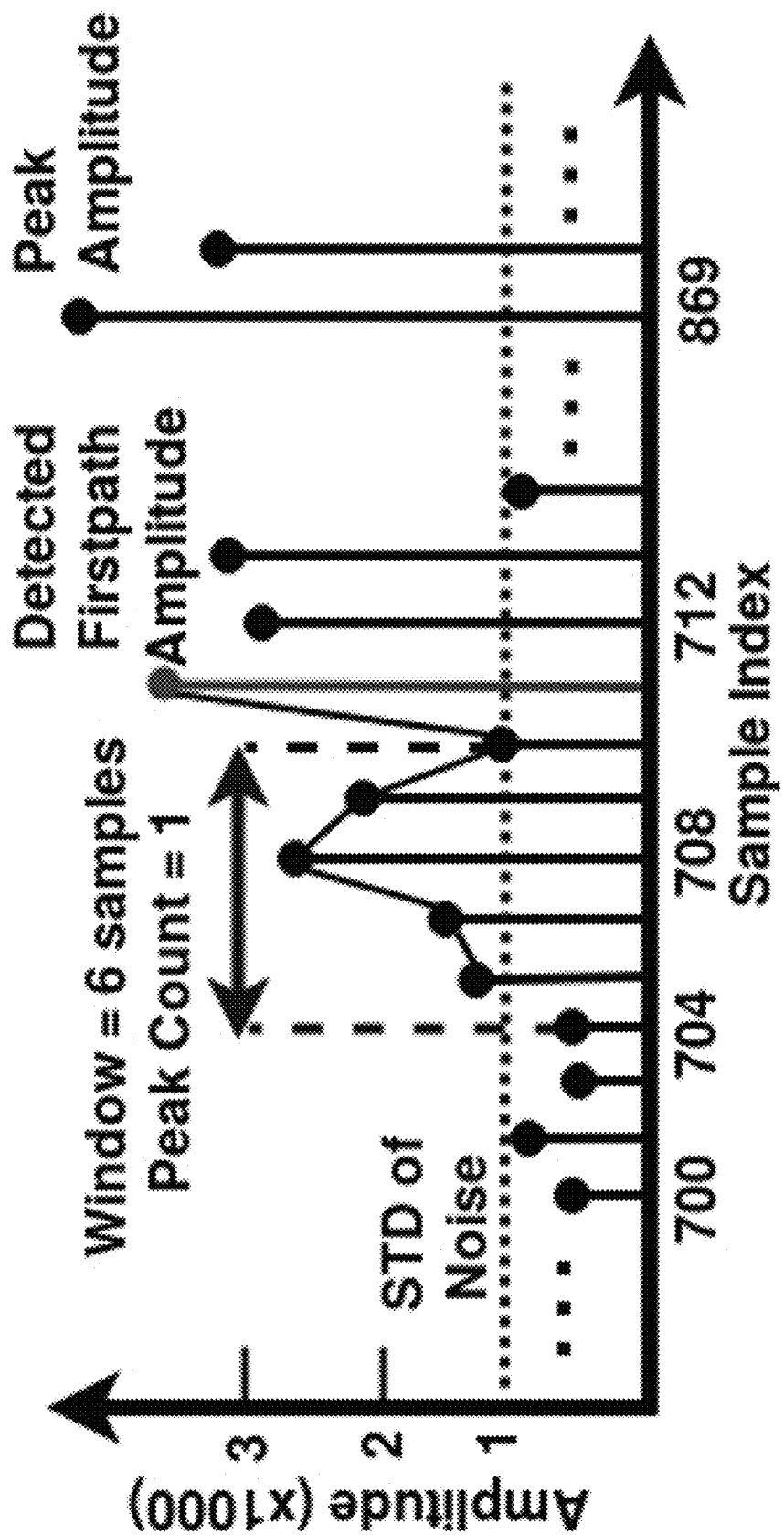
FIG. 8 is a plot showing first path detection in UWB receiver according to aspects of the present disclosure.

LOS vs. NLOS: Every node maintains a list of its neighbors, identified by overhearing their transmissions, whose channel impulse response (CIR) is also collected. A node i can thus directly range with any of its neighbors j, whose link quality ($L_{ij}$) is estimated from its corresponding CIR. $L_{ij}$ captures the potential accuracy of ranging on the link based on the certainty of it being a LOS (direct) or NLOS (indirect) path. This NLOS probability is computed by as $p_{NLOS}=(f_1 \times f_2 \times f_3 \times f_4)$, where $f_1$=avg. peak count before the detected first path (FP) in the preceding window (See FIG. 8), $f_2$=ratio of std-noise to FP amplitude, $f_3$=ratio of peak to FP amplitude and $f_4$=ratio of total received power to FP power. The link quality is the inverse of this probability. Initially, during the bootstrapping phase, every node sequentially broadcasts a beacon packet that is heard by its neighbors. Once the system reaches a steady state, the neighborhood list is implicitly maintained by all nodes without the need for additional ranging. This helps realize a physical connectivity graph across the nodes, where every edge is a potential candidate for range estimation and is weighted by its quality (i.e. certainty for delivering accurate ranges).

Mobility: In addition, every node i also maintains a mobility metric M that capture its location uncertainty since its last localization. This metric increases as a function of the time-since-localization (TsL) and is computed using the node's acceleration, $a_i$ (obtained from its IMU). In particular, for every IMU read (indexed by k), $M(k) \leftarrow M_i(k-1)+v_i(k) \cdot \Delta t$, where node velocity $v_i(k) \leftarrow v_i(k-1)+a_i \cdot \Delta t$, and $\Delta t$ is the elapsed time since the last IMU read. $M_i$ and $v_i$ are reset to zero, whenever the node is localized. When $a_i$ is zero (static nodes), we assign an exponential function to M as follows: $M_i \leftarrow (e^{TsL}-1)$. This allows the node to be prioritized for ranging, even if it is static, but sufficient time has elapsed since its last localization.

Geometric Rigidity: Recall that a rigid graph admits a unique relative localization solution. Since the connectivity topology of nodes might not be a rigid graph in practice, DynoLoc aims to select edges from this underlying connectivity that ensures maximal rigidity to the resulting node topology. It does so by identifying maximal rigid sub-graphs from the physical connectivity graph, by leveraging the construct of k-core sub-graphs that are used to ensure graph rigidity. In a k-core sub-graph, every vertex has a degree of at least k. It is known that a k-core sub-graph is rigid in k−1 dimensional space. Hence, for rigidity in 2D, we seek to obtain 3-core sub-graphs[3]. Note that a 2-core sub-graph will not be rigid in 2D and will admit multiple localization solutions.

[3] This allows DynoLoc to also be extended for 3D localization, where 4-core sub-graphs will be leveraged instead.

Figure 9:
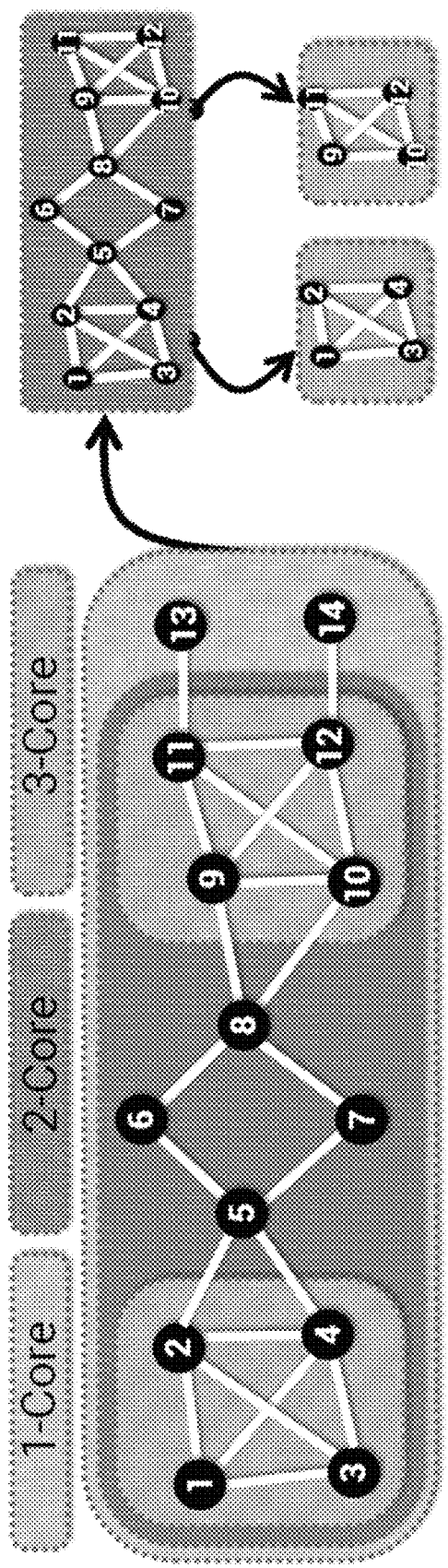
FIG. 9 is a schematic diagram illustrating an example of k-core decomposition according to aspects of the present disclosure.
Figure 10:
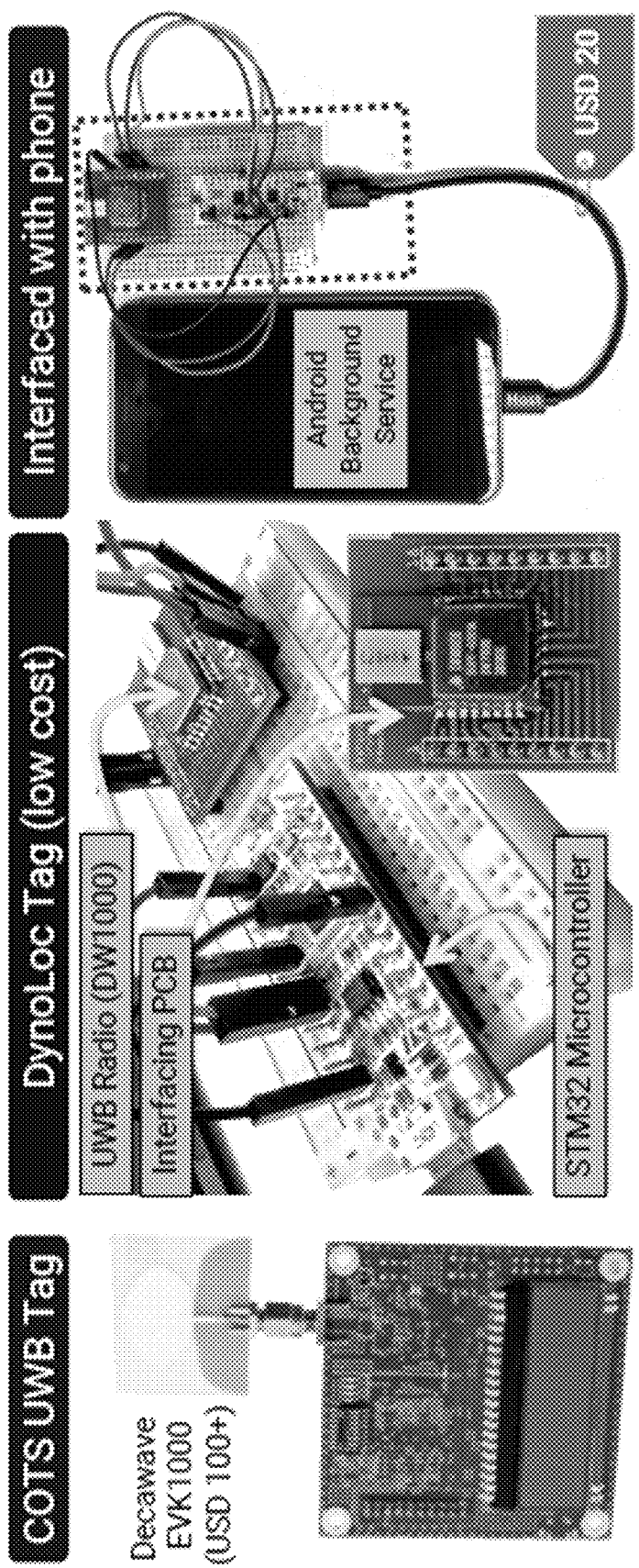
FIG. 10 is a schematic diagram illustrating a prototype of DynoLoc node according to aspects of the present disclosure.

DynoLoc identifies the maximal 3-core sub-graphs by starting with the connectivity graph and partitioning it into k-core subgraphs for k=1,2 and 3 sequentially. It starts with identifying 1-core nodes (one by one) that have a degree of 1 and removes them and their incident edges iteratively till no more 1-core nodes can be found. Then, it repeats the process for 2-core nodes with degree 2. After the removal of 1-core and 2-core nodes, we are left with maximal 3-core sub-graphs (as shown in the example in FIG. 9) that are rigid.

B. Estimating the Ranging Topology: We now describe DynoLoc's algorithm for edge and hence topology selection that will be used for ranging. At a high level, DynoLoc aims to devote its ranging resources to links, whose ranges are outdated (due to mobility), followed by those that contribute the most to the topology's rigidity, while also avoiding those with potentially inaccurate ranges (due to NLOS). Specifically, at every iteration, DynoLoc picks the node (say i) with the highest mobility M (location uncertainty) metric. If i is part of the 3-core, and has more than three edges, then three of its edges with the highest L metric (range accuracy) are selected. Otherwise, its incident edges (≤3) are directly selected. When multiple nodes have the same M metric, the node selection is done based on the kcore metric, with nodes belonging to a higher core (ties broken with higher node degree) prioritized over those belonging to a lower core. The process repeats until the ranging budget is exhausted by the edges selected for ranging. Initially, when the system is bootstrapped and no information on node mobility is available, all nodes are assumed to have outdated M metric and edge selection is done primarily based on their contribution to rigidity and their LOS nature. The complete DynoLoc method is presented in Algorithm 1.

Aggregated and Concurrent Ranging

DynoLoc optimizes its ranging protocol using two key mechanisms as follows.

Aggregated Ranging: UWB employs a two-way ranging (TWR) mechanism, standardized in IEEE 802.15.4, to estimate the distance between a node pair based on Time of Flight (TOF). Further, every node pair needs to be separately ranged following a strict TDMA schedule to avoid interference. This leads to a sequential ranging for the desired node pairs, consuming significant latency and hindering scalability. TWR involves exchanging 4 messages for a single range estimation. DynoLoc instruments an aggregated version of TWR where an initiator node sends a broadcast INIT message that also contains IDs of other nodes that it wants to range with in tandem. The receiving nodes take turns individually to send a POLL message, which is followed by a broadcast RESPONSE message from the initiator node. On receiving the RESPONSE message, the nodes take turn once again to send a FINAL message. Based on the timestamps in the above messages the initiator node calculates the distance estimates to individual nodes. Thus, our aggregated TWR can range N nodes in (2N+2) time slots compared to the 4N slots for its sequential counterpart. Given that each transmission slot time can be 10 ms, this substantial saving in turn allows for twice as many links to be ranged with the same latency budget.

Concurrent Ranging: While the UWB protocol employs TDMA to avoid wireless contention, it does not account for spatial reuse, wherein node pairs outside each other's interference domain can be operated simultaneously. DynoLoc can easily compute such link concurrency information based on the neighborhood information for each node as discussed earlier. Hence, a set of initiator nodes and their corresponding ranging nodes are logically partitioned into non-interfering groups, with every group containing an initiator node. Each of the initiator nodes executes the aggregated TWR process concurrently to range relevant nodes in its group. Such concurrent ranging, that makes use of spatial reuse, provides a significant increase in the ranging budget that is beneficial for large node topologies.

DynoLoc employs the above ranging protocol to collect ranges for links in its ranging topology. Such optimizations also result in a significantly larger ranging budget (within the application's refresh rate) for use by its edge selection component that in turn contributes to a larger localization accuracy.

Robust Relative Localization

DynoLoc employs the latest (epoch) ranges collected from the ranging topology, along with other ranges from prior epochs that are accurate and not outdated, to determine the relative localization of nodes. Existing solutions require a complete m×m EDM matrix of ranges for a m node topology to determine the relative localization (embedding) of nodes. Matrix completion techniques (e.g. OptSpace, SDR) are used to complete the missing EDM entries in practice, but deliver poor accuracies, owing to the lack of (i) rigidity over the entire topology, and (ii) incorporation of geometric structure. DynoLoc innovates in both these aspects to deliver a robust relative localization solution as follows.

A. Estimating Missing Ranges: DynoLoc performs EDM completion only on the rigid sub-graphs (3-core sub-graphs) of the topology, individually. The rigidity of the sub-graph (say, with n nodes) enables a more accurate EDM completion of n×n. Further, it leverages the geometric topology of the nodes to complete the missing EDM entries as follows (Algorithm 2). The algorithm starts by initializing the EDM with the measured ranges and then fills in the missing ranges through sequential multilateration. In the process, it also computes the relative locations of all the nodes. It maintains two copies of the EDM, one based on the inter-node ranges obtained solely from the computed relative node locations, and the other including the actual measured ranges, where available. It then iteratively perturbs or updates the relative location of each node to minimize the gap between these two EDMs, and further updates the EDM from the subsequent node locations. Thus, the error in the estimation of missing ranges is minimized.

B. Relative Localization: Having identified the rigid and non-rigid components of the topology, DynoLoc first solves for the relative localization of nodes in the rigid sub-graphs individually, followed by those in the nonrigid components.

Rigid Component: Having completed the EDM for the rigid component, DynoLoc employs the Multi-dimensional Scaling (MDS) solver to find the node embedding (relative localization) solution. Note that while sequential multilateration is appropriate for EDM completion, it is not employed for the eventual localization itself, as the location error tends to increase rapidly for the nodes being mulitlaterated later. In contrast, with MDS solvers, the order of the multilateration does not matter—with the multilateration error being part of the objective function, it is equally distributed across all steps of the multilateration process. The MDS problem can be defined as: Given a squared EDM $D^2$, find the corresponding relative location matrix X. In matrix notation, this is equivalent to solving for $B=XX^T$ where $X^T$ is the transpose of matrix X. DynoLoc employs the Classical MDS (CMDS) solver, which works as follows:

Given square-distance matrix $D^2$, compute Gram matrix B of X as $B=-\frac{1}{2}JD^2J$, where $$J = I - \frac{1}{n}11T.$$

Find the Eigenvalue decomposition of $B=QAQ^T$,

Finally, compute X=Q sqrt(A) for Eigenvector matrix Q and diagonal Eigenvalue matrix A.

Due to the "centering" assumption, each column of solution X sums to zero i.e, the origin of X coincides with the centroid of the n locations. Note that CMDS minimizes the loss function (also called strain) $L(X)=\|XX^T-B\|=\|HXX^{T-1/2JD^2}J\|$. In doing so, it updates the range entries only for the missing edges but leaves the edges with measured ranges untouched. The CMDS can result in local minima, which are more likely to occur, when the dimension is low (2 as in our case). Hence, DynoLoc cross-validates the locations using heading data retrieved from the IMUs of nodes and also employs a smoothing filter on the successive node locations over a small window.

Non-Rigid Component: Having solved for the relative locations of the 3-core nodes, DynoLoc now considers the nodes in the non-rigid components, namely the 2core and 1-core nodes. By definition, every 2-core node has two edges to the rigid component(s). It employs these two ranges to find the relative location of the 2core node. However, with just two ranges, there are two possible solutions. DynoLoc eliminates one of these solutions easily by leveraging the link quality of edges in the neighborhood of the solution. If the solution has a neighboring rigid node (other than the rigid nodes of its two edges), this will contradict its 2-core status (as another edge to a rigid component exists) and the solution can hence be eliminated. Once the 2-core nodes are also solved, the remaining 1-core nodes are determined using the angle that the corresponding edge (to the rigid component) makes with the North-South axis of the earth using the IMU data. This computation is done as part of the absolute localization procedure discussed next.

Absolute Localization

DynoLoc needs to transform the localization solution from a relative coordinate system to a target absolute coordinate system. This is achieved by translating, rotating, and flipping the rigid graph derived in the previous step with the help of IMUs (on the nodes) or floormap information.

IMPLEMENTATION AND EVALUATION

System Implementation and Prototype

As presently constituted, our DynoLoc system includes a set of UWB tags, interfaced with an embedded computer (e.g., a smartphone or a Raspberry-Pi) and a central controller that orchestrates range measurements and runs the localization algorithms. Both, the controller and the embedded computer are connected to a local WiFi network for exchanging control information and application data (e.g., sensor readings, video feeds).

DynoLoc UWB Tag: The tag consists of a Decawave DW1000 ultra-wideband radio (costs ≈10$) that houses an extremely precise picosecond crystal (for TOF calculation), which can achieve a distance resolution as high as 2.2 mm. We interface the DW1000's SPI pins (serial clock, master output, master input and slave select), $V_{cc}$ and GND pins to a low power ARM Cortex-M based microcontroller unit STM32 NUCLEOF042K6 (costs≈10$), where the latter acts as the SPI master. DynoLoc's optimized ranging protocol is implemented in about 4000 lines of C code and runs on the STM32 microcontroller. Additionally, the STM32 sends and receives specific ranging instructions or estimated ranges through its serial port from an external host device. While most commercially available UWB tags cost somewhere between $100-200, DynoLoc tags show that it is feasible to keep the cost to under 20$ (1020% of the COTS tags) without compromising any feature. Our tags can use the UWB permissible channels spanning from 3-7 GHz (with 500 MHz bandwidth). In most of the experiments, we use 3.5 GHz as the center frequency for improved range.

Tag Host: An embedded computer (e.g., a smartphone) acts as a USB host for the DynoLoc Tag. It sends specific ranging instructions to the tag (e.g., range with 5 specific neighboring nodes) and receives measured ranges. The tag host also keeps track of the node's mobility from the inertial sensors as well as the link quality information as obtained from the tag (M and L metrics). The device driver for our tag is implemented on the Android platform and runs as a background service intercepting commands from the controller and passing it on to the tag and vice versa. The tag host also houses a pressure sensor to identify the vertical elevation, i.e., floor number which is useful in a multi-story deployment scenario.

Controller: The controller is in charge of the overall topology estimation, gathering ranges from individual tags and running the localization engine. Depending on the application, the controller sends the information back to the individual nodes, displays them locally in a dashboard or offload it to a cloud service for remote visualization or decision making. The controller logic is implemented in about 1000 lines of Python code.

System Evaluation

DynoLoc is evaluated comprehensively spanning in the-wild deployments to controlled experiments in realistic indoor settings (supplemented by simulations only for larger topologies of over 16 nodes). In the following, we describe our methodology followed by some key performance results.

In-the-Wild Deployment

Figure 2:
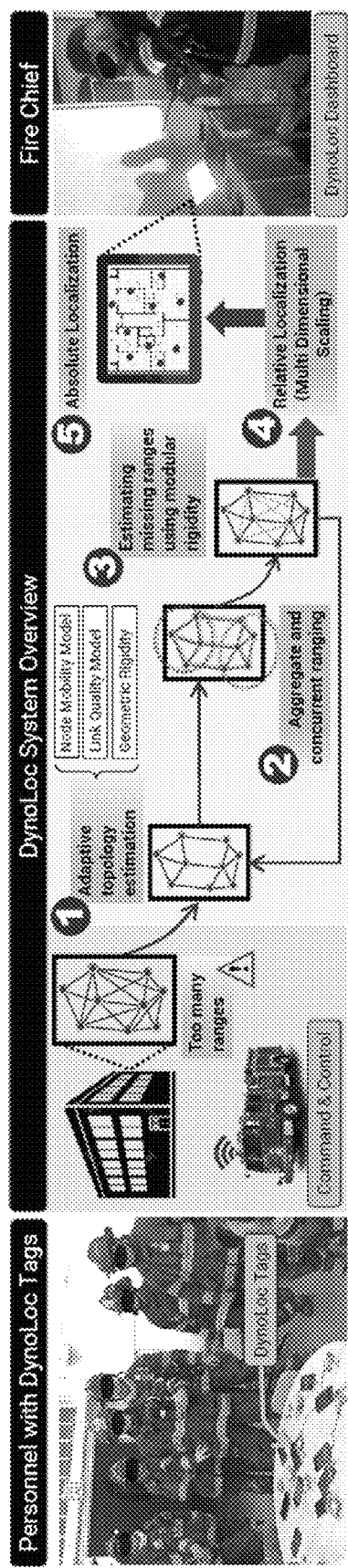
FIG. 2 is a schematic diagram showing illustratively personnel with DynoLoc tags, the DynoLoc system overview, and a fire chief monitoring a DynoLoc dashboard according to aspects of the present disclosure.

DynoLoc has been deployed and tested in a real firefighter's drill. A total of ten firefighters, each carrying a DynoLoc tag individually, enter the test building (2 floors[4], each ≈50 m×100 m) emulating a severe fire incident. The fire chief, stationed outside the building, tracks every move of the personnel crawling through the dark and smoky passages through DynoLoc's realtime dashboard and instructs them accordingly through a walkie-talkie. In one specific incident, a firefighter who was lost and separated from his colleagues issued an SOS call. The chief knowing his location was able to intervene and immediately assist by redirecting his crew accurately towards the lost firefighter. We learned (from the fire chief) DynoLoc's true value in such challenging scenarios, which are common and often lead to firefighter fatalities. A snapshot of the drill is shown in FIG. 2.

[4] A pressure-sensor+UWB based mechanism, for floor identification at each node locally, was added to DynoLoc for this drill.

Controlled Experiment

Testbed: The testbed includes eight pre-planned navigable routes (marked with adhesive tapes on the floor) in an indoor area of about 50 m×40 m. The collective length of the routes is ≈500 meters The routes encompass various types of indoor areas: open hallways, corridors, meeting rooms, lab spaces and so on, such that we have a fair representation of typical indoor settings (both LOS and NLOS). In addition to the DynoLoc tag (+smartphone host), each volunteer carries another UWB tag operating at a different frequency (6.5 GHz) for ground truth collection.

Baselines: The ground-truth is collected using a system of densely placed, synchronized, static anchor nodes (by multilateration using TDOA information), deployed throughout the building floor, which gives a localization accuracy in the order of 10-20 cm, thereby serving as a lower bound on performance for infrastructure-free solutions. We also consider two heuristics that are subsets of DynoLoc, namely H-Agnos and H-Dyn. H-Agnos employs DynoLoc's relative localization component but adopts a naive edge selection approach (ranges every pair of possible edges through round-robin) that does not account for node dynamics and link quality. In contrast, H-Dyn's edge selection accounts for node mobility by ranging on edges incident with the most dynamic nodes, but disregards the geometric rigidity requirement in its relative localization.

Figure 11A:
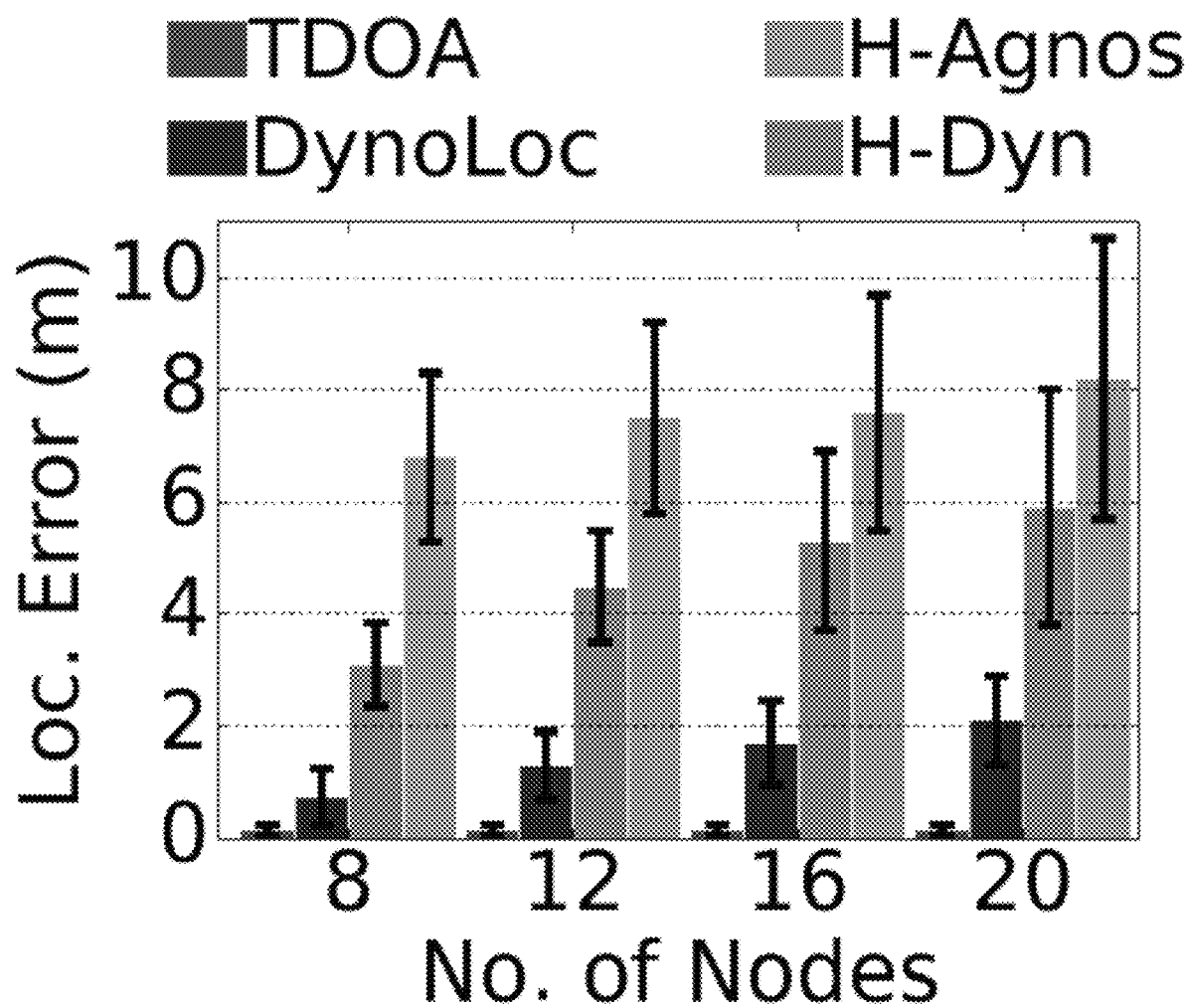

Overall Localization Performance: FIG. 11(A) highlights DynoLoc's overall performance as a function of various factors, namely number of nodes, fraction of mobile nodes, their velocity and the targeted location update rate. DynoLoc scales well for a reasonable number of nodes (FIG. 11(A)) that is practical in most real life contexts. Even in challenging scenarios, where all the nodes are mobile (at 1 m/s), DynoLoc provides an average localization error of under 2 meters for a 1 Hz update rate, while H-Agnos and H-Dyn incur an error of 6-7 meters and 5-6 meters respectively (FIG. 11(B)). Lack of DynoLoc's robust relative localization component (included in H-Agnos and H-Dyn), will only lead to further degradation. While H-Agnos accounts for underlying graph rigidity, it is devoid of the notion of node mobility and link-quality and hence, renders poor accuracy; whereas H-Dyn takes into consideration the node mobility, but renders poor accuracy due to lack of enforcing rigidity requirement. Also note that, even for a more demanding location update rate of 2 Hz, DynoLoc maintains a sub-meter localization accuracy (FIG. 11c), even when half the nodes are mobile. DynoLoc's ranging algorithm being mobility-aware, adaptively expends the available time resources in collecting the most critical ranges. This allows it to deliver under 2 m accuracy even when 4 times the update rate is desired. Benefits of DynoLoc's Design: DynoLoc's design components are benchmarked in isolation as follows.

Figure 11B:
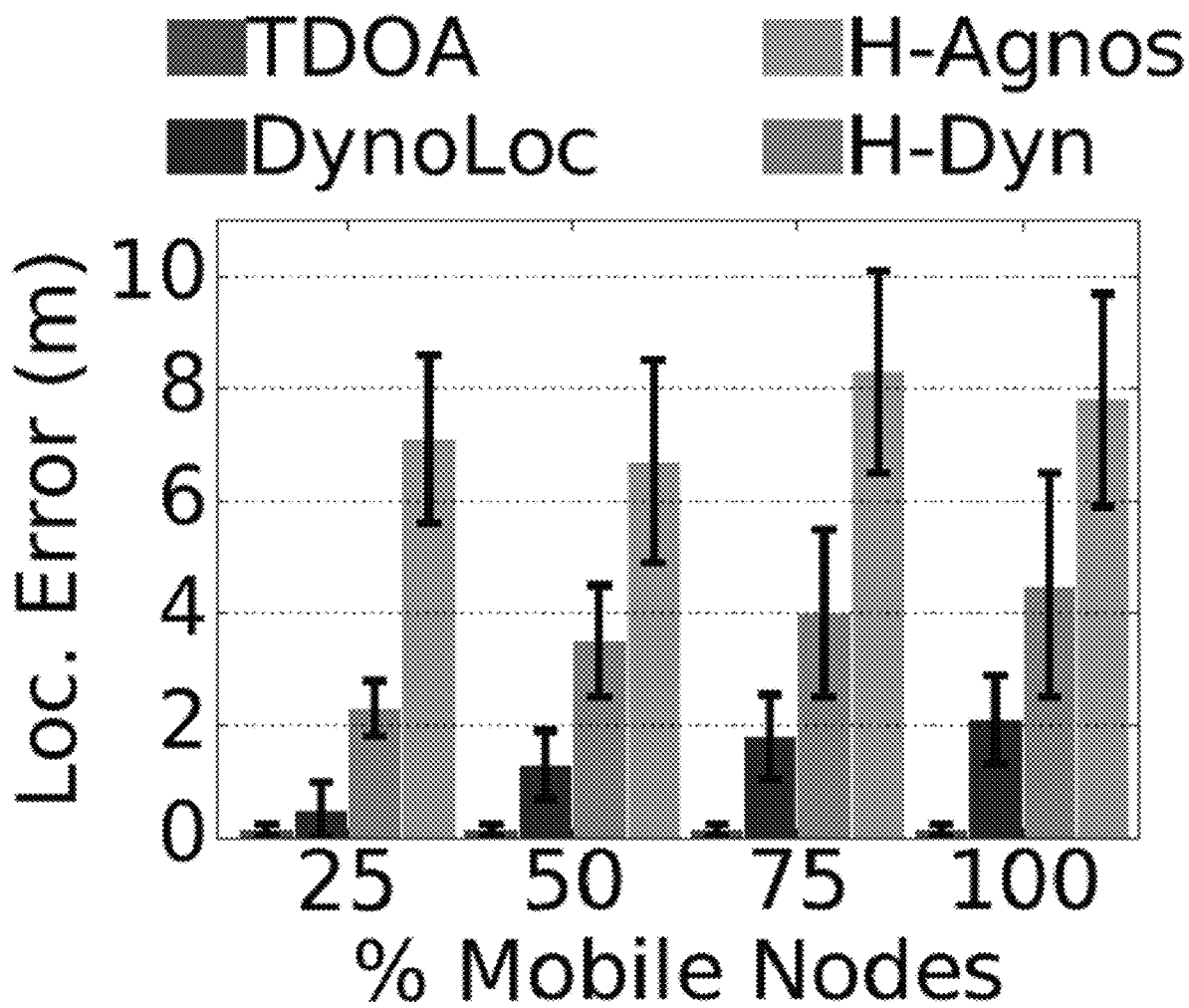
Figure 11C:
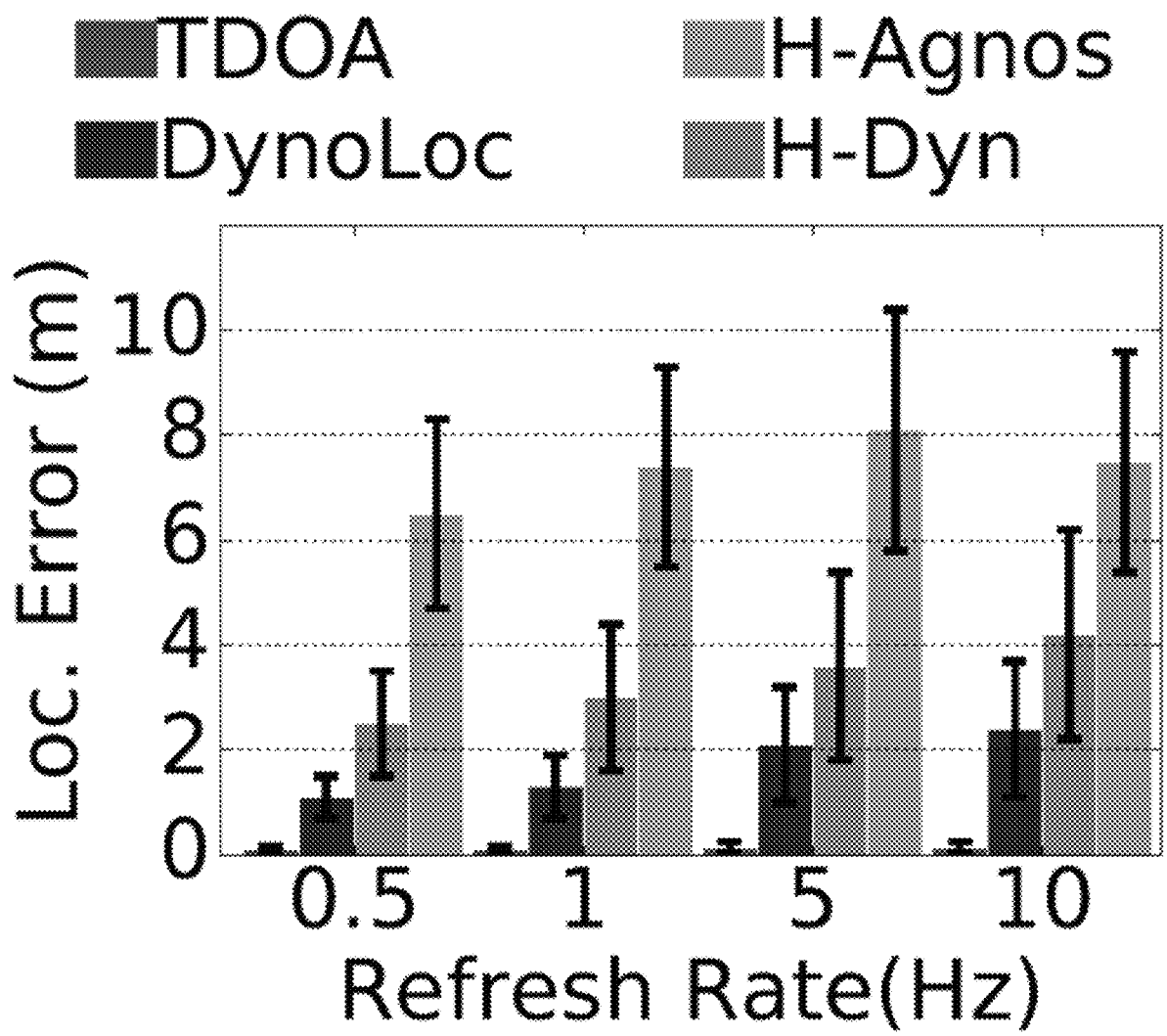
Figure 11D:
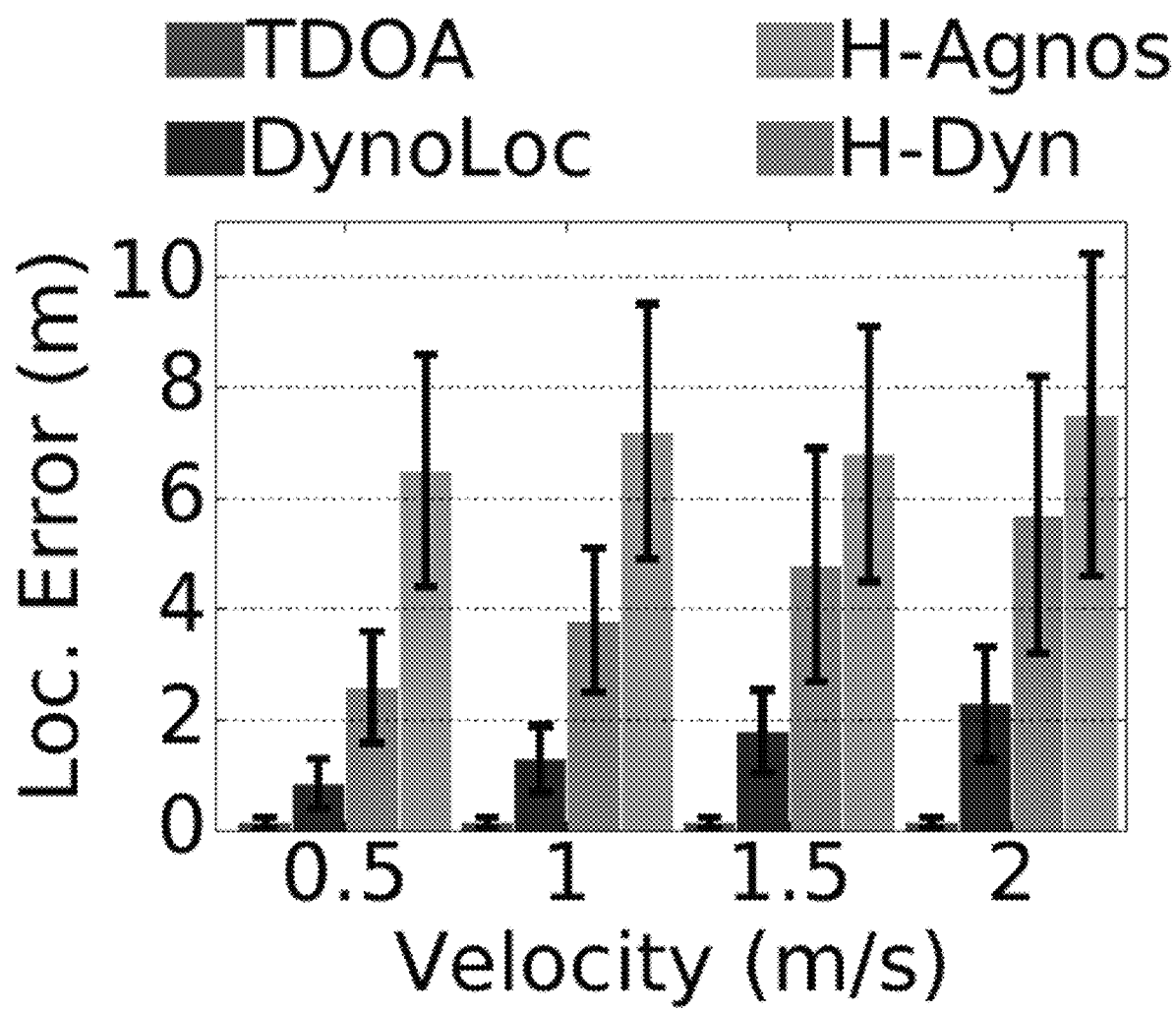

Adaptive Ranging: FIG. 11(A) and FIG. 11(B) clearly show the significant merits and usefulness of DynoLoc's adaptive ranging (edge selection) mechanism (compared to random selection in Rand). We now explore the merits of its mobility and link quality metrics as part of its topology estimation.

Figure 12A:
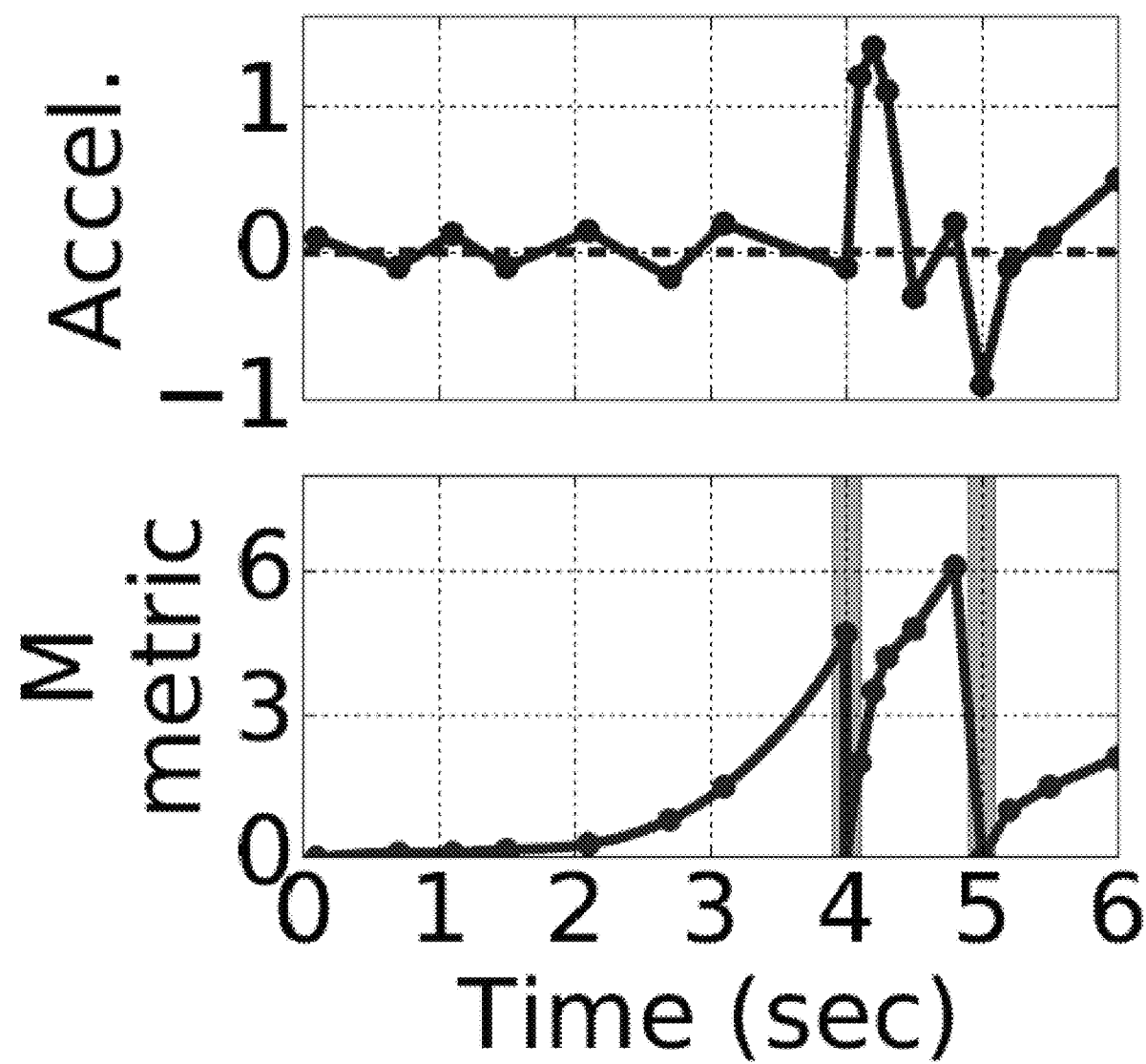
FIG. 12(A) is a plot showing consistency of Mobility Metric according to aspects of the present disclosure.
Figure 12B:
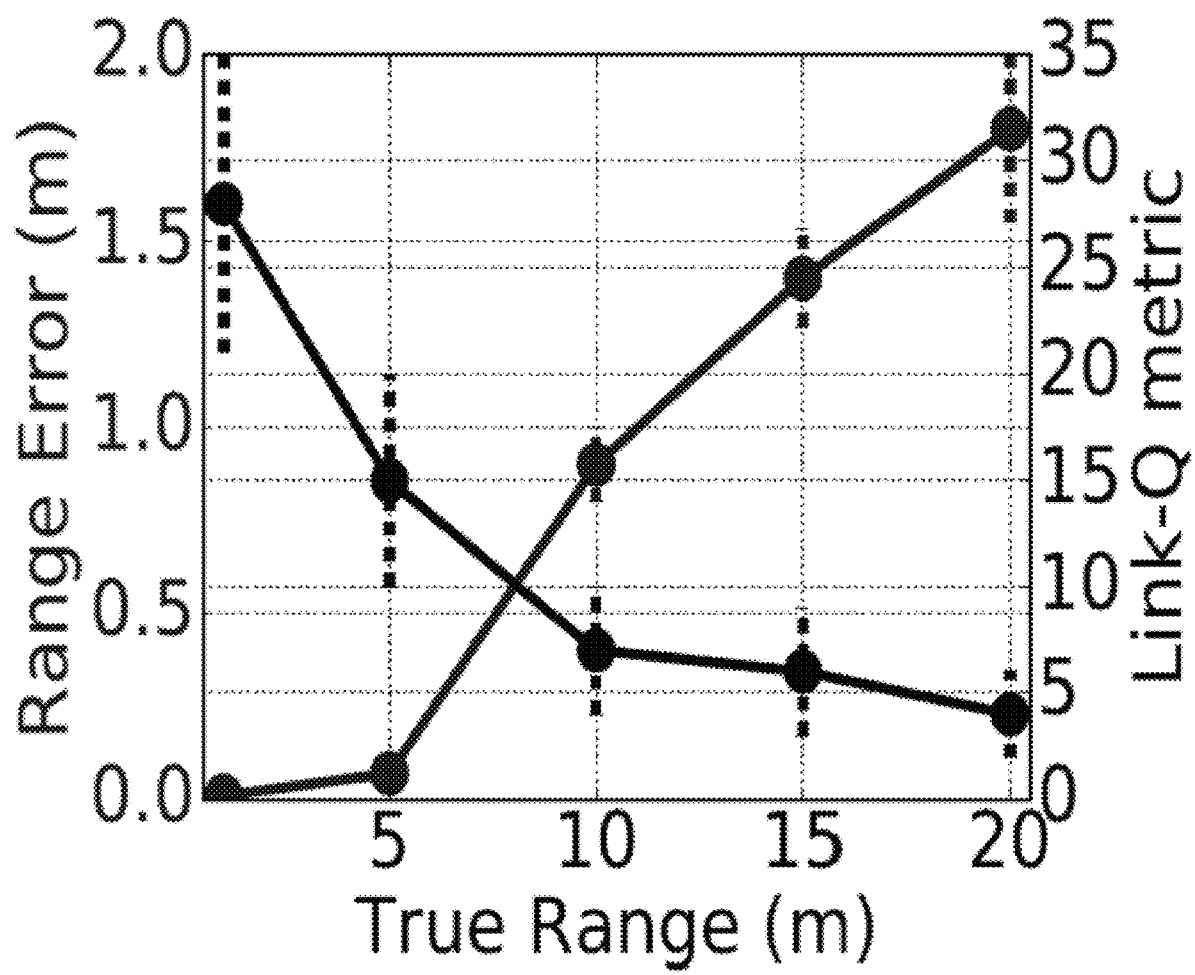
FIG. 12(B) is a plot showing correlation of Link Quality metric with ranging error according to aspects of the present disclosure.
Figure 13A:
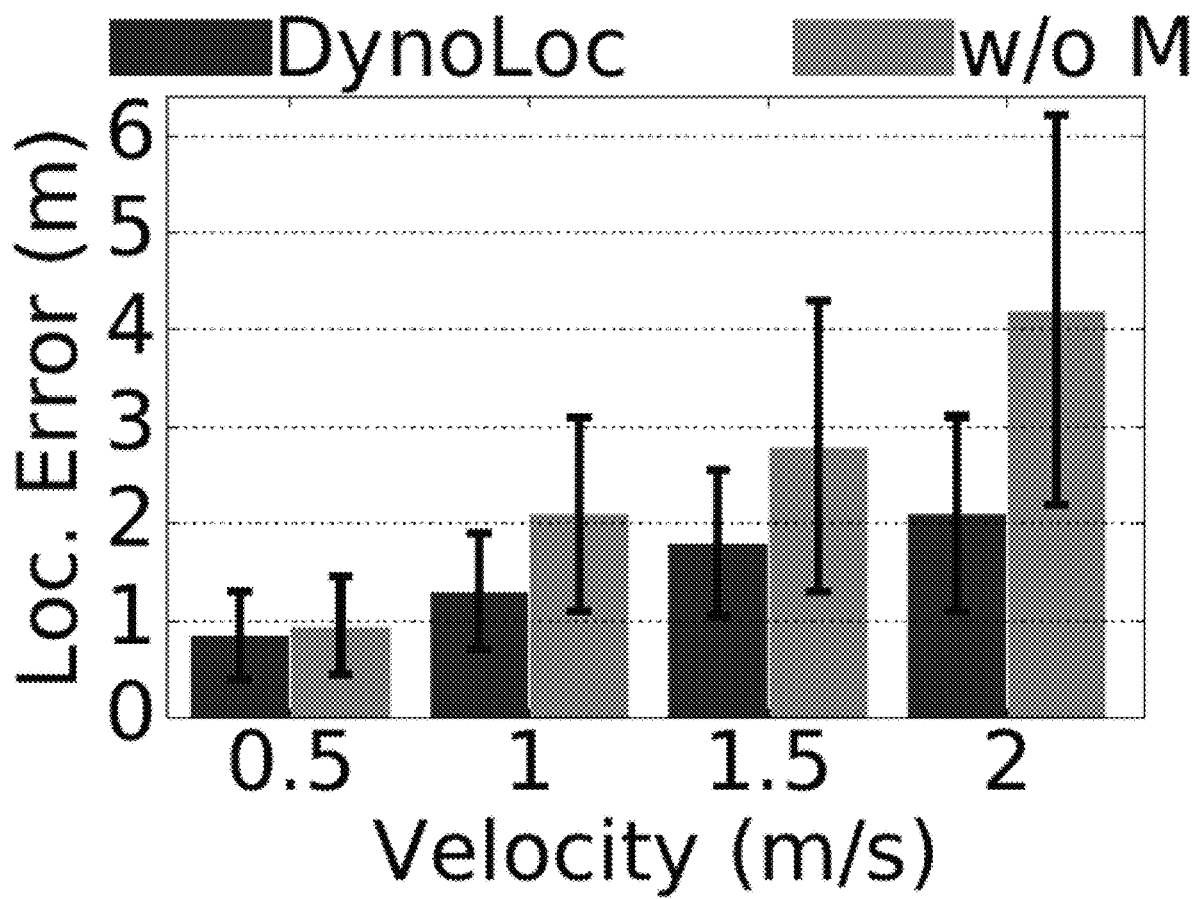
FIG. 13(A) is a plot showing comparison of DynaLoc without Mobility Metric according to aspects of the present disclosure.

Mobility Metric: FIG. 13(A) demonstrates that performing the edge selection (purely based on rigidity constraints) without considering mobility metric (M) results in a sub-optimal localization accuracy. Additionally, FIG. 12(A) shows the reactive nature of the M metric in tracking node mobility through its acceleration.

Figure 13B:
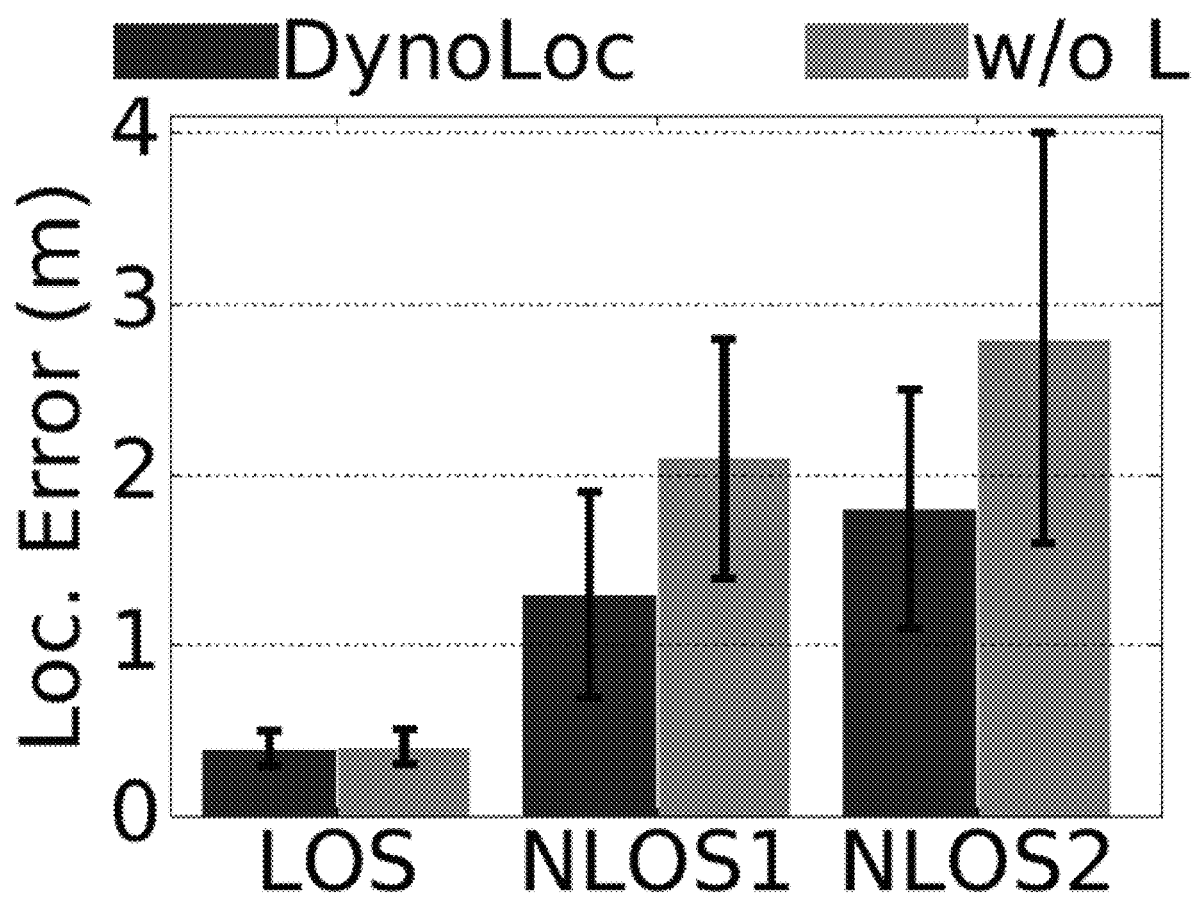
FIG. 13(B) is a plot showing comparison of DynaLoc without Link Quality (L) metric according to aspects of the present disclosure.

Link Quality Metric: Similarly, FIG. 13(B) shows the impact of link quality metric (L) on edge selection. L acts as a classifier for NLOS versus LOS ranges. Particularly in NLOS scenarios, L plays a critical role in selecting non-noisy edges, thereby leading to a better localization accuracy. FIG. 13(B) indicates that introducing the L metric improves accuracy by 30-40% in two different NLOS scenarios (meeting rooms/office space and lab spaces denoted by NLOS1 and NLOS2 respectively).

Figure 14A:
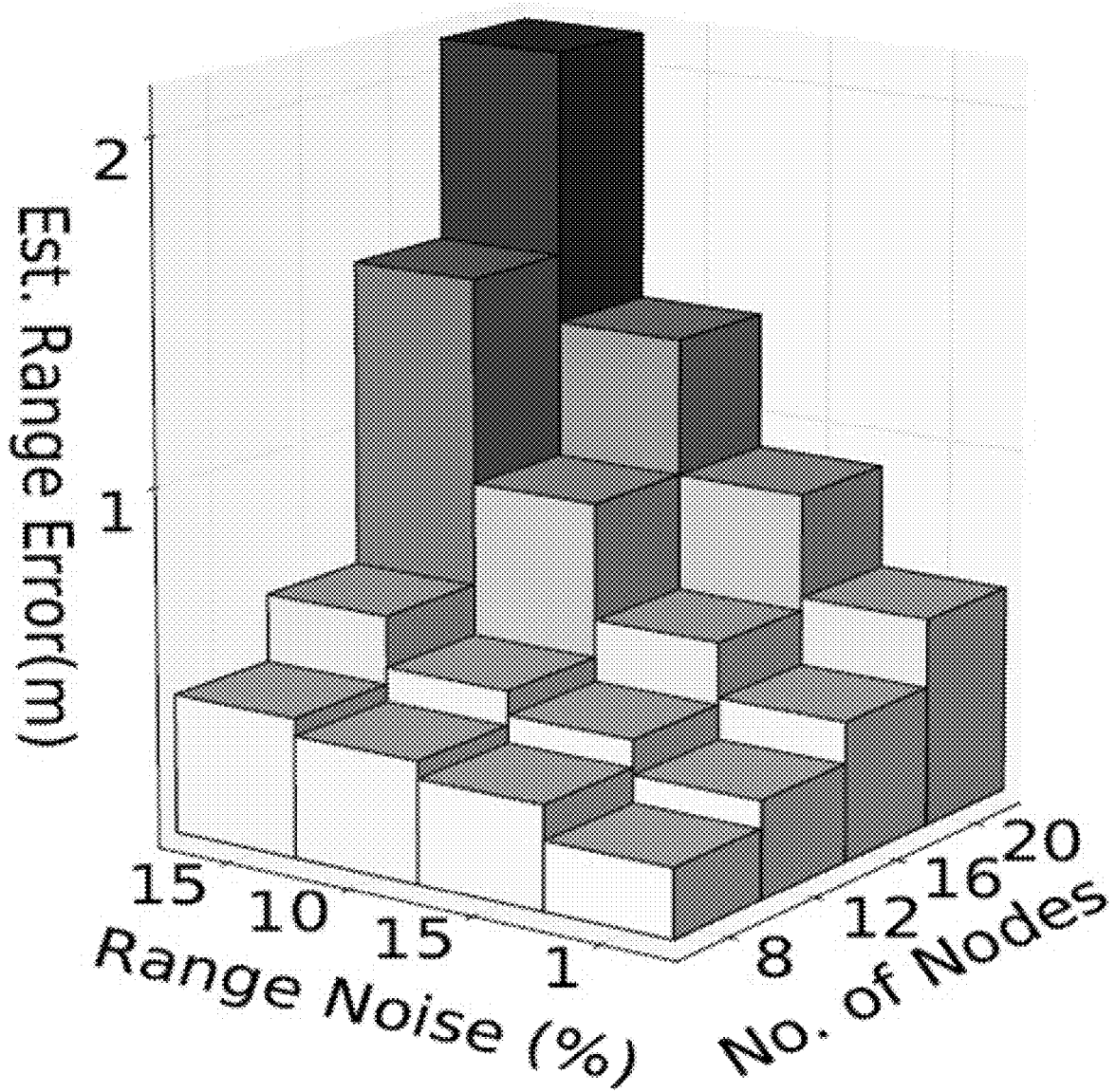
FIG. 14(A) is a plot showing EDM completion error according to aspects of the present disclosure.
Figure 14B:
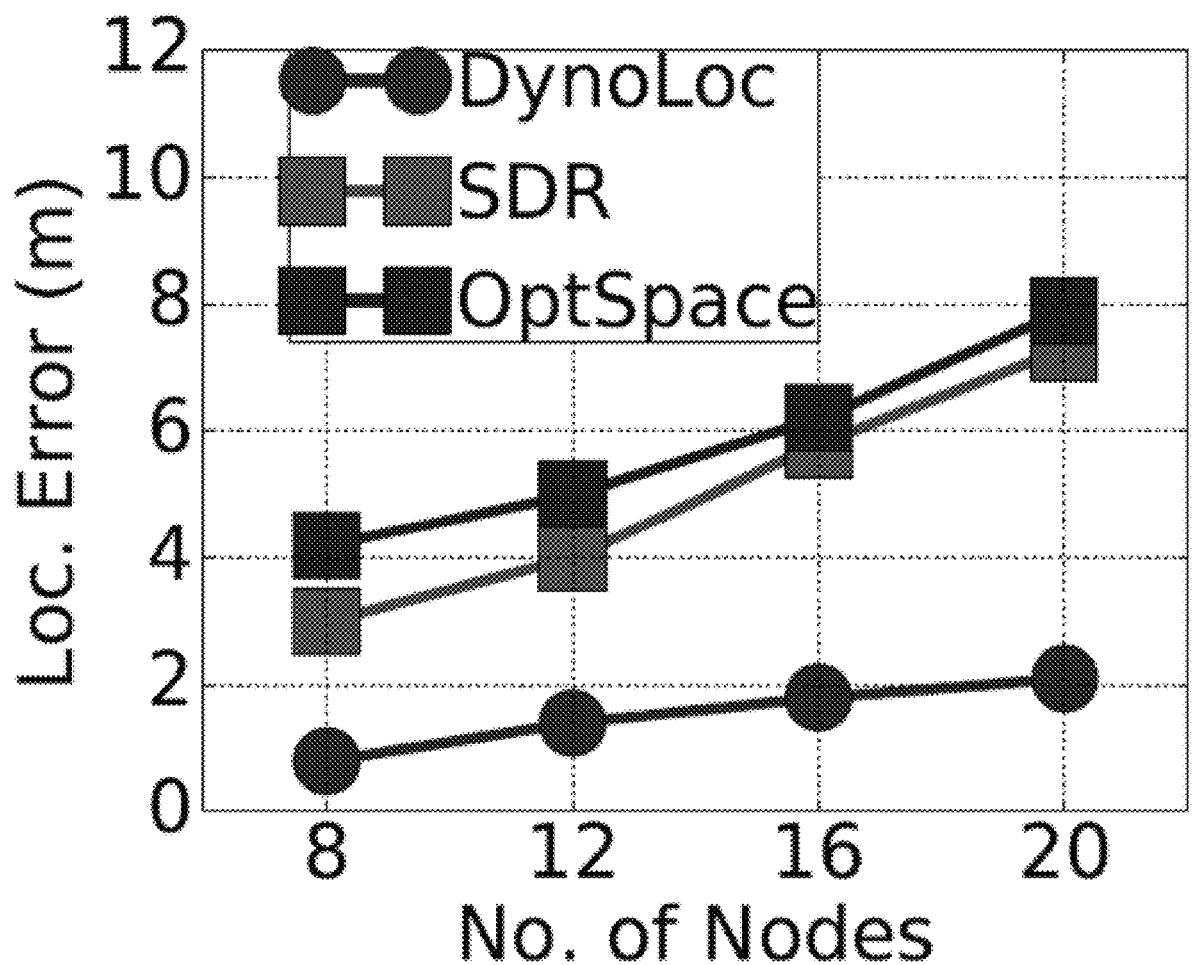
FIG. 14(B) is a plot showing relative location error according to aspects of the present disclosure.

Robust Relative Localization: FIG. 14(A) shows that DynoLoc's EDM-completion approach can advantageously bound the range estimation (for missing entries) to within 2 m in most cases. This can be attributed to its approach of targeting the rigid sub-graphs individually, while using a sequential multilateration approach that exploits the node geometry for estimating the missing ranges. Its rigid subgraph based relative localization further contributes to a much improved accuracy over existing approaches as seen in FIG. 14(B).

Figure 15A:
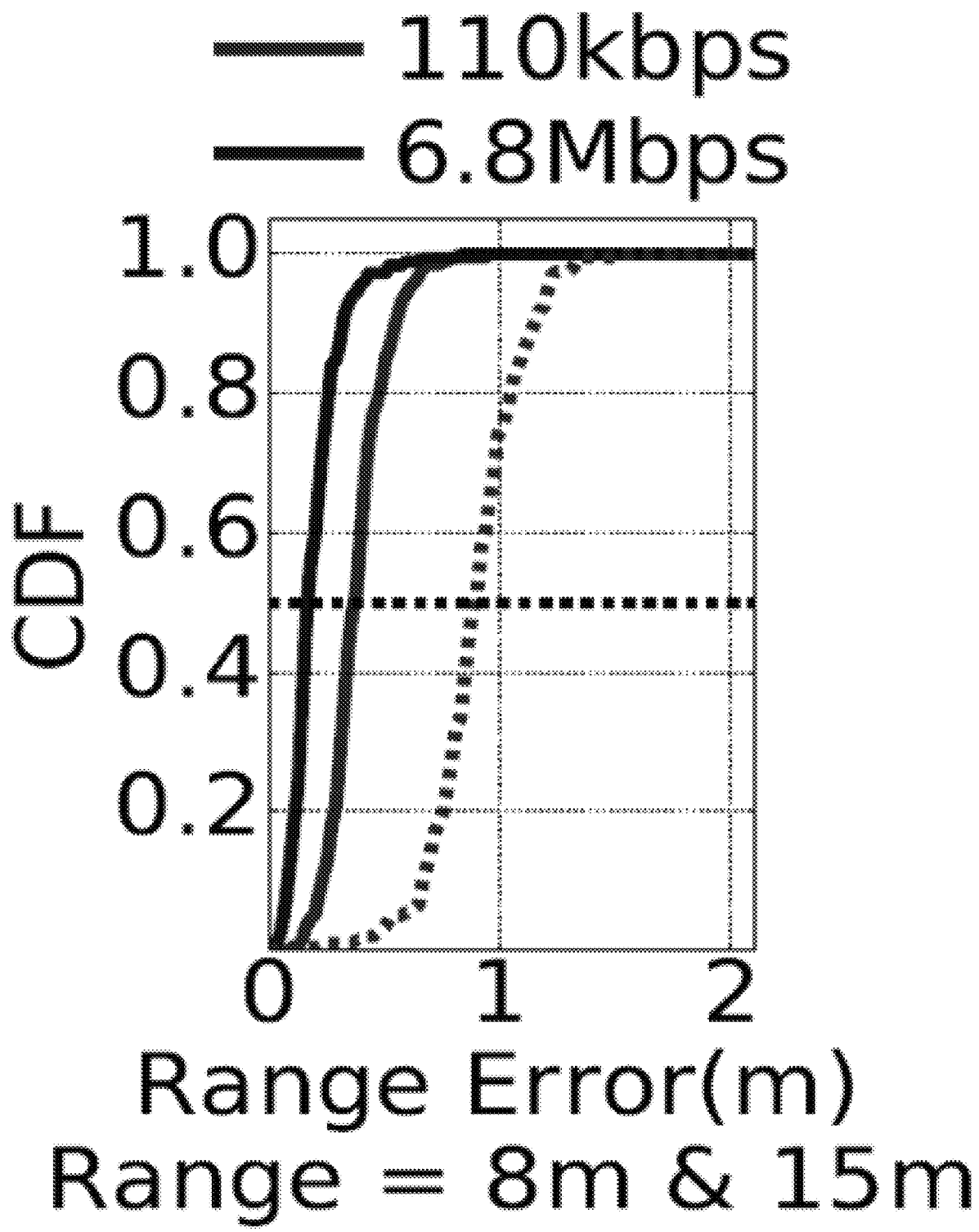
FIG. 15(A) is a plot showing ranging error for different modes of UWB according to aspects of the present disclosure.
Figure 15B:
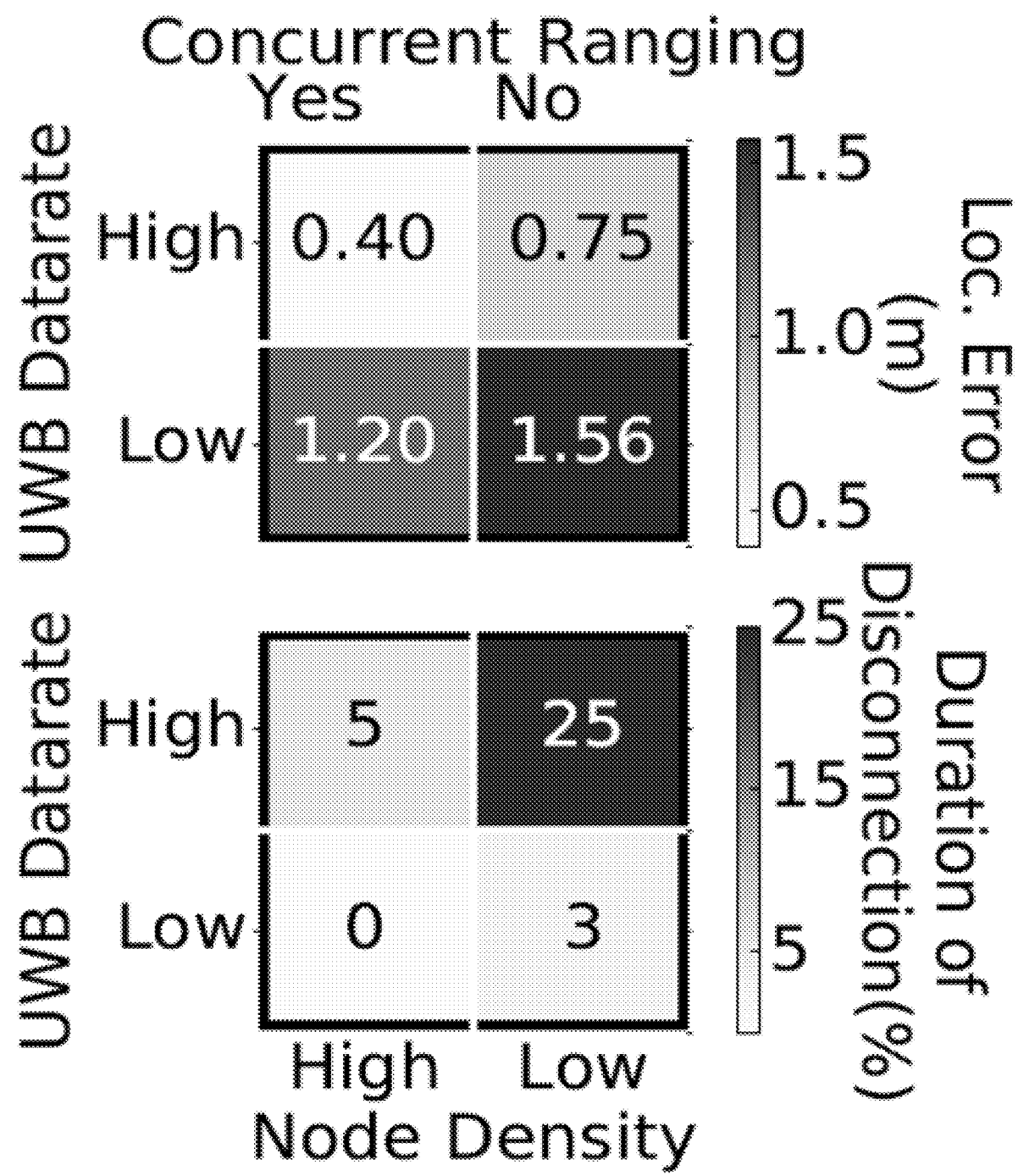
FIG. 15(B) is a plot showing location accuracy & node dis-connectivity for concurrent ranging UWB data rates and node densities according to aspects of the present disclosure.

Concurrent Ranging: As seen in FIG. 15(B), DynoLoc's aggregated and concurrent ranging directly contributes to a larger ranging budget and hence localization accuracy. DynoLoc's tag supports two data rates (low, 100 Kbps and high, 6.8 Mbps, FIG. 15(A)). The high data rate results in a lower latency per ranging (2 ms vs 8 ms for low data rate case). While it restricts the maximum communication range (about 10 m) and allows for more concurrent ranging, it also requires a higher node density to ensure a reasonably connected topology. This is reflected in the results presented in FIG. 15(A).

Figure 16A:
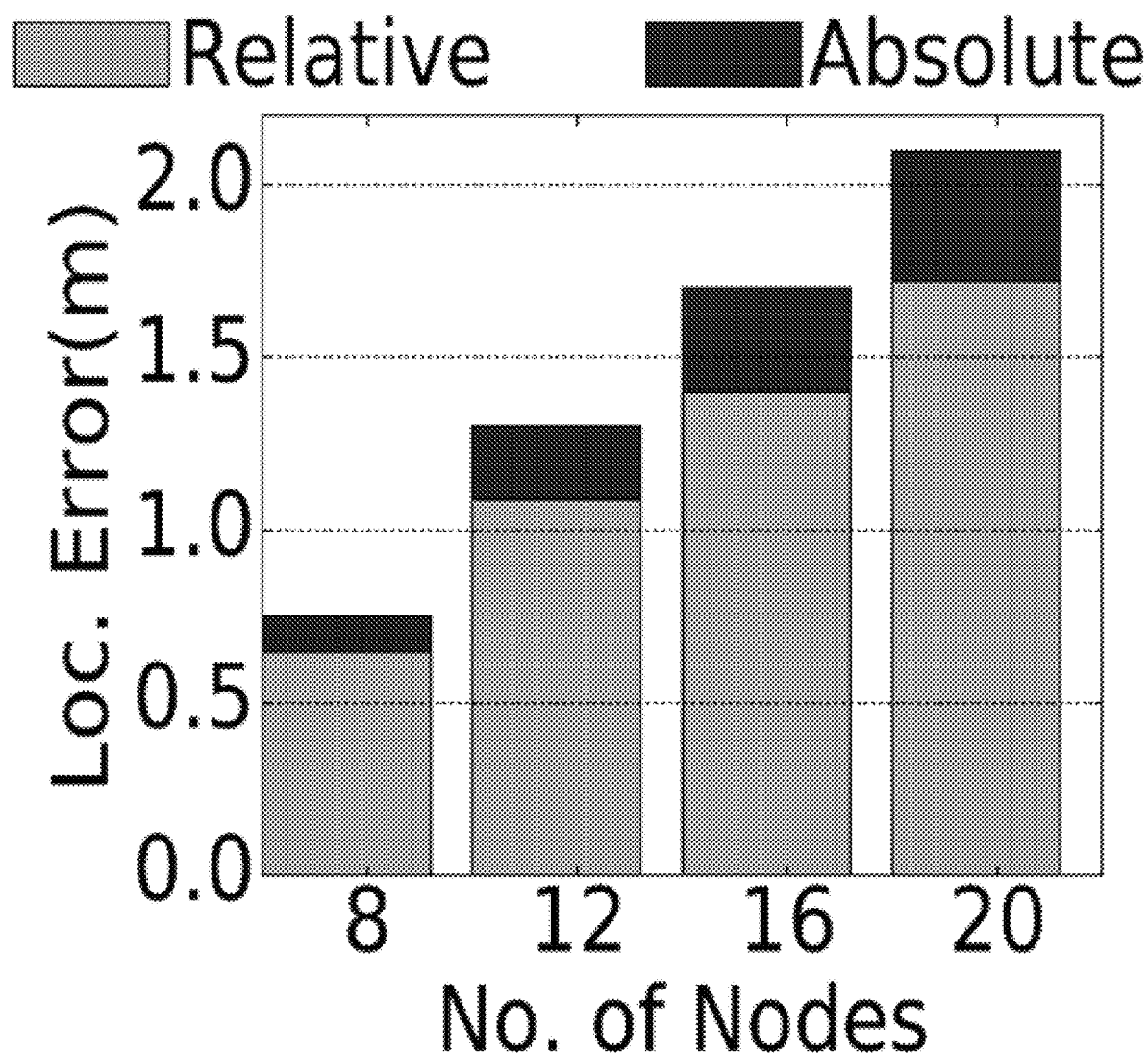
FIG. 16(A) is a plot showing accuracy of absolute localization according to aspects of the present disclosure.

Absolute Localization: Conversion of relative to absolute localization incurs an additional error of 10-20%, as shown in FIG. 16(A). As expected, it increases as the network size grows larger.

Figure 16B:
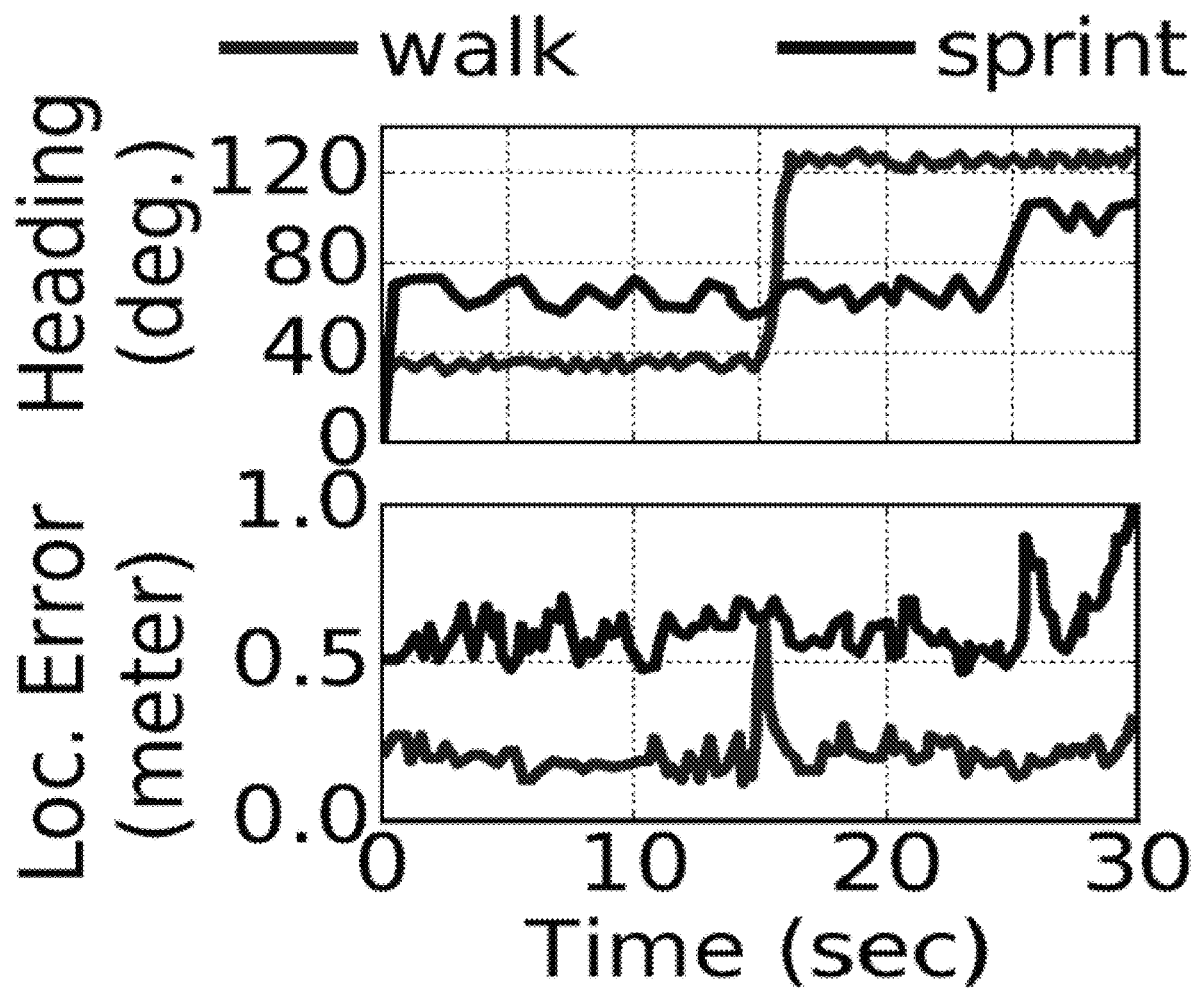
FIG. 16(B) is a plot showing impact of heading error according to aspects of the present disclosure.

FIG. 16(B) shows how the value of heading is tracked over time as the user moves (walk and sprint). While noisy heading values lead to higher additional errors, this is still restricted to just 40-60 cm even for a user sprinting at 2 m/s.

Figure 17A:
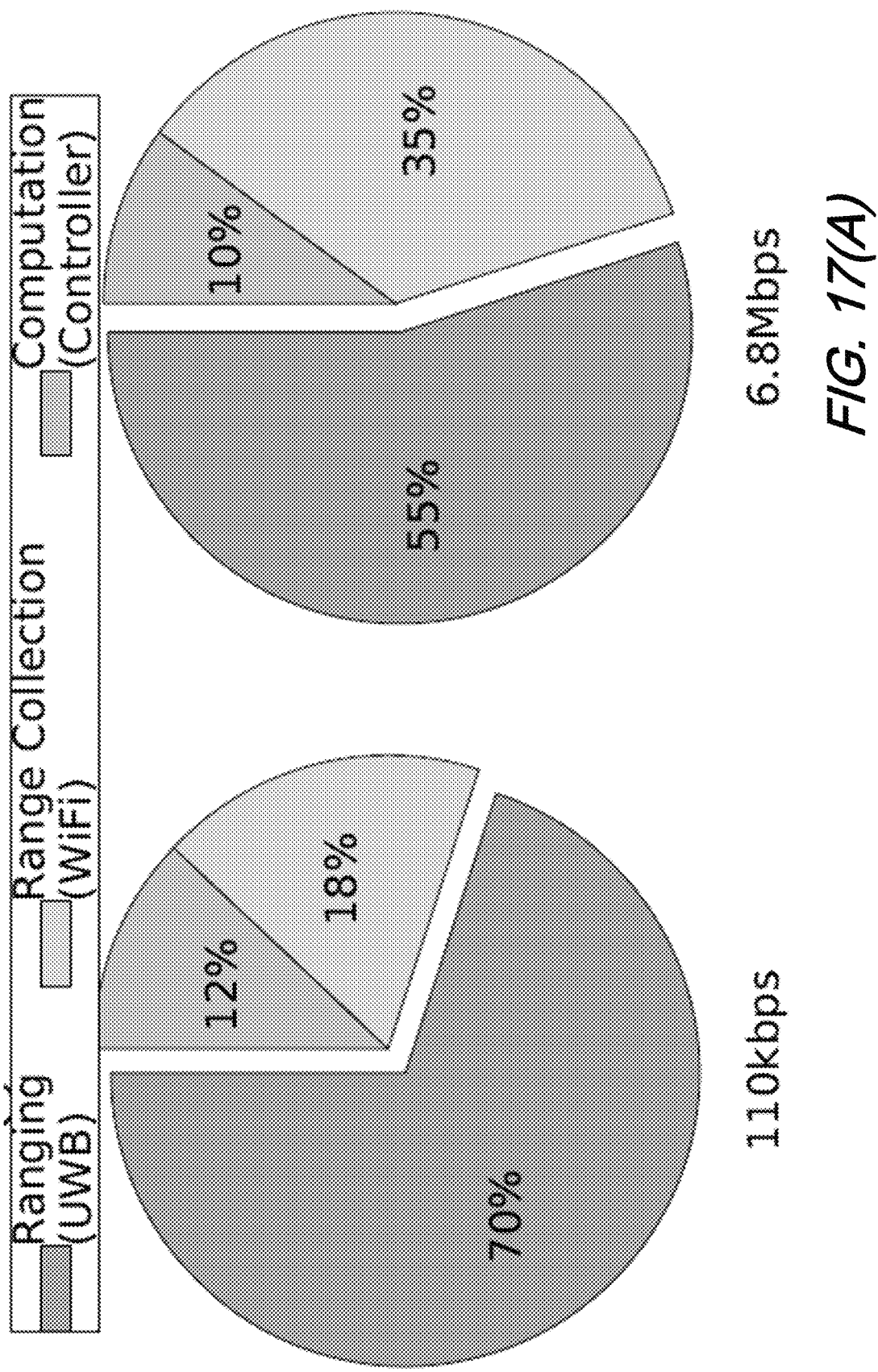
FIG. 17(A) is a plot showing breakdown of latency components according to aspects of the present disclosure.

End-to-End System Latency: FIG. 17(A) breaks down DynoLoc's overall latency broadly into three categories. In the table shown in FIG. 17(B), we present some battery life benchmarks for different components of the system.

APPLICATIONS

DynoLoc enables a host of location-based applications that benefit from minimal setup time, preferably without any infrastructure deployment, realtime support.

Multiplayer AR/VR Gaming

Contemporary multiplayer AR/VR gaming systems do not support features that have bearing to players' location in the physical coordinate space. Given the growing demand for 'location-based entertainment, recent solutions make use of visual SLAM (using VIO) to localize players with respect to their individual reference frames. However, for a collaborative multiplayer setting, a global coordinate system is essential. This is accomplished today using either visual markers or anchors that do not offer a smooth multiplayer experience, or expensive/extensive installation of IR cameras and laser tags that do not offer a cost-effective, on-demand deployment (e.g. consumer homes).

Figure 18A:
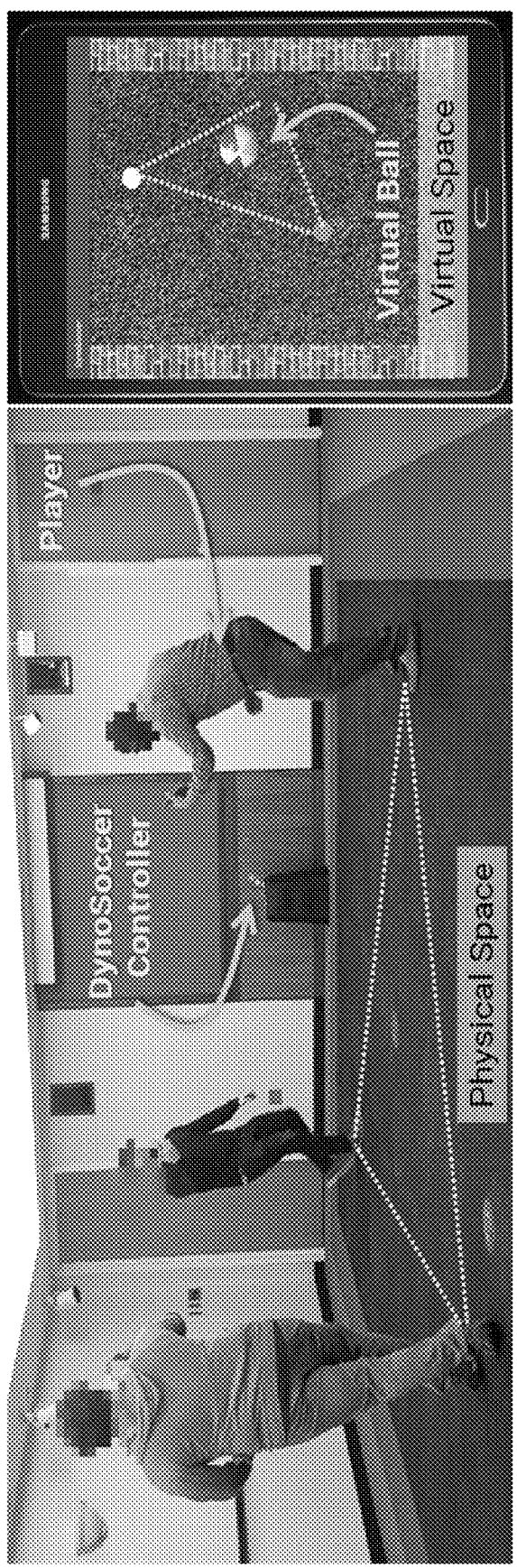
FIG. 18(A) is an illustration of DynoLoc enabled location-based multiplayer gaming according to aspects of the present disclosure.
Figure 18B:
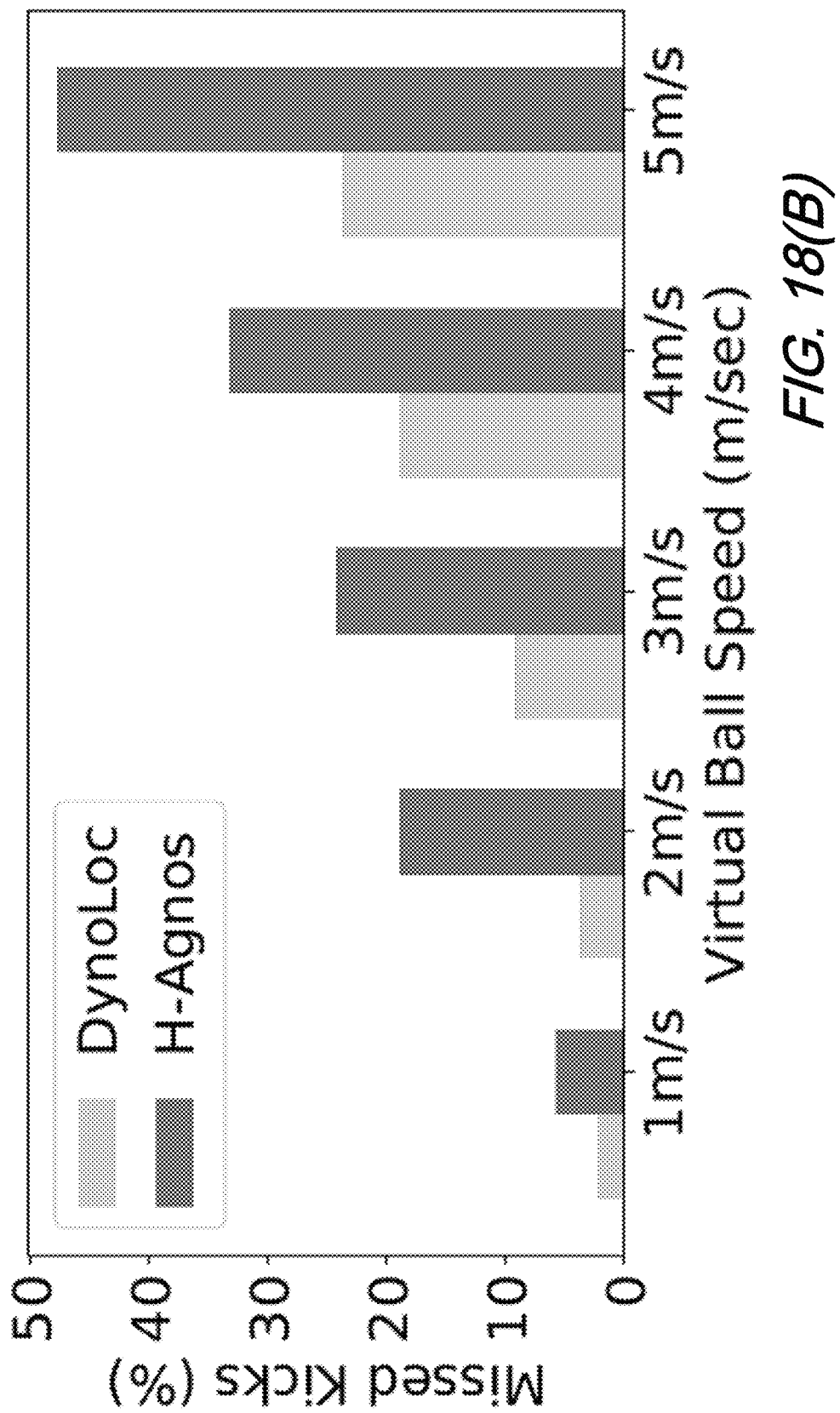
FIG. 18(B) is a plot showing mobility-aware range scheduling according to aspects of the present disclosure.
Figure 18C:
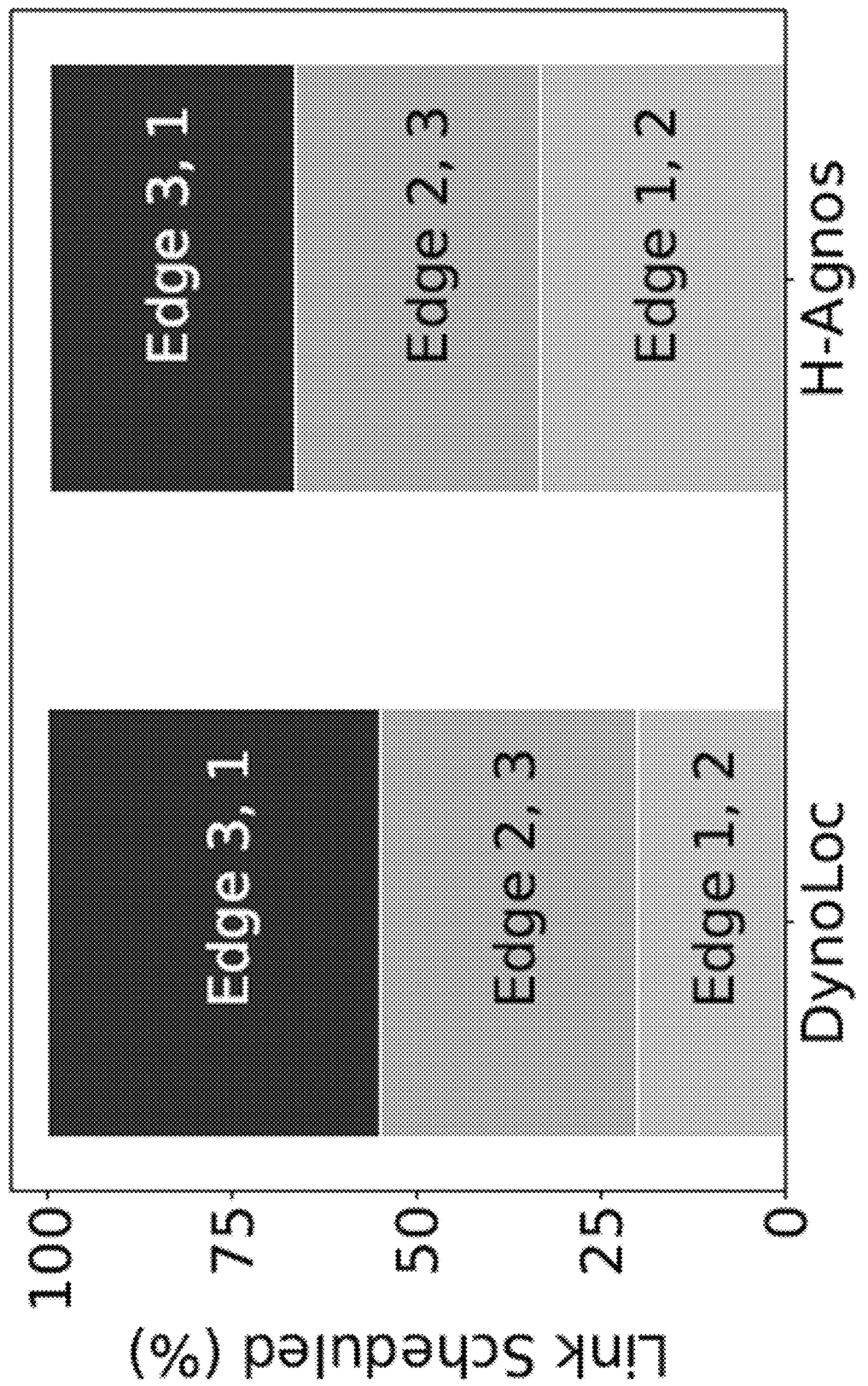
FIG. 18(C) illustrates mobility-aware range scheduling distributed time slots across nodes improving overall interactivity of a game according to aspects of the present disclosure.

We created a simple Android based multiplayer VR game called DynoSoccer to demonstrate the value that DynoLoc can bring to such gaming systems. DynoSoccer transforms ordinary physical spaces, like a living room that is not particularly well-lit or textured, into a gaming arena, where players can interact with each other based on their real physical locations. The game involves a virtual ball that is bounced around by the players. Each player needs to adjust their position to be in the proximity of the ball in order to 'kick' it. However, this requires the system to be responsive to the players' and the ball's movement, otherwise resulting in a 'missed kick'. We show (FIG. 18(A), FIG. 18(B)) that even for high ball speeds, DynoLoc results in 50% to 90% less 'missed kicks' compared to the H-Agnos baseline, increasing the VR experience significantly. DynoLoc adaptively schedules the relevant ranges (compared to round-robin in H-Agnos) in the topology based on the mobility of individual players. We plan to fuse VIO with DynoLoc to overcome VIO's challenges in less-favorable visual environments (FIG. 1), especially in the multi-player context.

Active Shooter Scenario

Figure 19A:
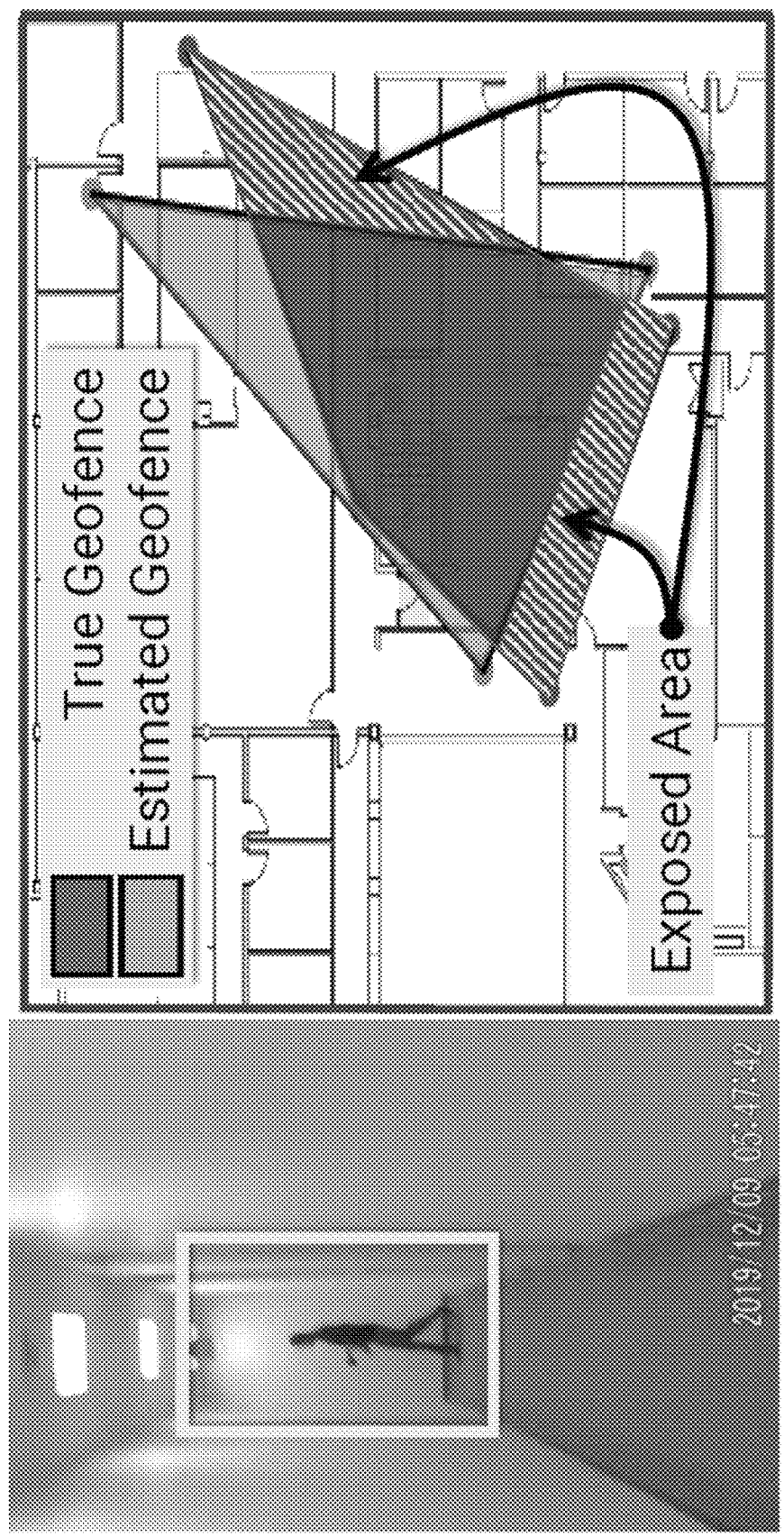
FIG. 19(A) illustrates a DynoLoc enabled real time geofencing according to aspects of the present disclosure.
Figure 19B:
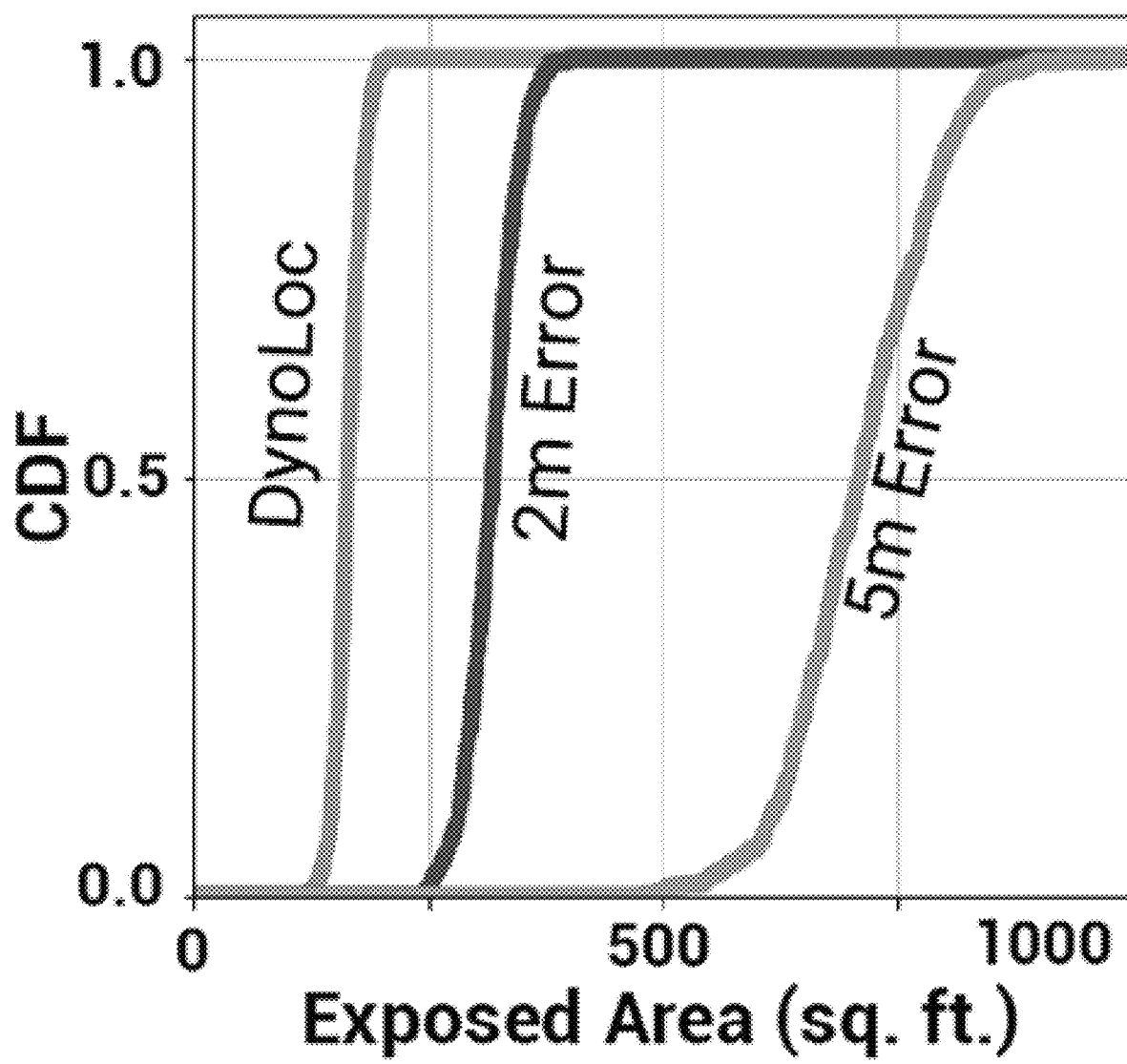
FIG. 19(B) is a plot showing the illustration of FIG. 19(A) according to aspects of the present disclosure.

We demonstrate in FIG. 19(A) and FIG. 19(B) how DynoLoc can create a realtime geofence for safe evacuation of trapped victims in a chaotic situation like spotting an active shooter. A person mimicking an active shooter runs in a specified path. Four volunteers (unaware of the shooter's path) equipped with DynoLoc tags and body camera scout the general area (corridors, hallways etc.). If the shooter is detected in the video frame, we mark the respective location as unsafe and update the geofence (a polygon connecting the unsafe points). We show in FIG. 19(A)—right, how localization error can lead to inaccurate geofencing resulting in 'exposed areas' or zones that are potentially dangerous but marked safe. Even a 2 m median localization error can lead to a few hundred sq. ft. of exposed area, compared to the DynoLoc's limited exposure.

---

Algorithm 1 DynoLoc Algorithm

1: Make every node send hello frame
2: Collect and initialize link quality metric L
3: Run core-decomposition based on L
4: Build initial rigid graph $G_R$
5: Initialize mobilty metric M
6: while True do
7:   Choose node i with the highest metric M(i)
8:   Remove i (with its edges) from $G_R$ or V'
9:   if i has ≥ 3 edges with $G_R$ then
10:     Select 3 edges for i with max. L
11:     Add i back to $G_R$ with selected edges
12:   else
13:     Put i in the excluded node list V'
14:     Select i's edge(s)
15:   end if
16:   Range for the. above-selected edges [§3.3]
17:   Set M(i) ← 0
18:   Update M & L metrics from collected data
19:   compute core-decomposition
20:   Remove nodes which are not in 3-core, from $G_R$
21:   if Refresh interval elapsed then
22:     Complete EDM for $G_R$ [§3.4.A]
23:     Determine relative locations [§3.4.B]
24:     Determine & output absolute locations [§3.5]
25:   end if
26: end while

---

Algorithm 2 EDM Completion Algorithm

1: Initialize EDM with incasured ranges
2: Compute node locations using multilatration on the rigid graph
3: Fill in the missing values in D using node locations
4: Initialize EDM $D_{cur}$ using node locations
5: while $\Delta D = |D - D_{cur}|$ is significant do
6:   Update location of node i, j for each edge (i, j) in proportion to the $\Delta D(i, j)$
7:   Recompute $D_{cur}$ from node location
8:   Fill in missing values in D from node locations
9: end while
10: Output Complete EDM D

---

CONCLUSION

We have introduced a problem of latency-bounded infrastructure free localization that is central to several dynamic indoor applications. Towards addressing the fundamental tradeoff between latency and localization accuracy that arises in these problems, we presented the design and practical realization of our DynoLoc system. Through various design innovations, DynoLoc has demonstrated its ability to accurately track a large network of highly mobile entities, without any infrastructure support, in real-world firefighters' drill, as well as applications of multi-player AR gaming, and active shooter tracking While we have presented this disclosure using some specific examples, those skilled in the art will recognize that our teachings are not so limited. Accordingly, this disclosure should be only limited by the scope of the claims attached hereto.

The invention claimed is:

1. A method for infrastructure-free, radio-frequency (RF) tracking of a plurality of mobile nodes in a dynamic indoor environ gent comprising:
providing each individual one of the plurality of nodes located in the infrastructure-free, dynamic indoor environment with a radio tag;
determining a topology estimate of the plurality of nodes;
determining relative localizations of the plurality of nodes by generating rigid k-core sub-graphs of the topology estimate;
transforming the relative localizations into absolute localizations; and
outputting indicia of the absolute locations.

2. The method of claim 1 wherein the topology estimate is determined from critical links that contribute to the topology's localization accuracy and vary spatia-temporally.

3. The method of claim 2 wherein the critical links are determined by fusing three dimensions of information.

4. The method of claim 3 wherein the three dimensions of information include mobility of nodes in the link, certainty of range estimates inferred from channel impulse response measurement, and link contribution to topology geometry in creating sub-graph producing increased localization accuracy.

5. The method of claim 4 wherein the radio tag provides a wireless communication facility selected from the group consisting of WiFi, UWB, and mmWave.

6. The method of claim 5 wherein the WiFi communication facility is used for control, UWB is used for ranging.

7. The method of claim 6 wherein the radio tag further includes an inertial sensor (IMU).

8. The method of claim 7 wherein the relative localizations of the plurality of nodes is determined from the rigid k-core sub-graphs by applying an Euclidean distance matrices (EDM) technique to the sub-graphs.

9. The method of claim 8 further comprising determining relative localizations of any remaining nodes any remaining nodes from their range data, physical connectivity and MU heading data.

10. The method of claim 9 wherein the relative localizations of the remaining nodes is determined from a floor plan of the dynamic indoor environment, said indoor environment not having any beacons.

* * * * *